(12) United States Patent
Kozuki

(10) Patent No.: US 11,320,534 B2
(45) Date of Patent: May 3, 2022

(54) ULTRASONIC DETECTING DEVICE AND ULTRASONIC DETECTING METHOD

(71) Applicant: FURUNO ELECTRIC CO., LTD., Nishinomiya (JP)

(72) Inventor: Kohei Kozuki, Kariya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 375 days.

(21) Appl. No.: 16/491,267

(22) PCT Filed: Feb. 22, 2018

(86) PCT No.: PCT/JP2018/006434
§ 371 (c)(1),
(2) Date: Sep. 5, 2019

(87) PCT Pub. No.: WO2018/163844
PCT Pub. Date: Sep. 13, 2018

(65) Prior Publication Data
US 2020/0025917 A1    Jan. 23, 2020

(30) Foreign Application Priority Data

Mar. 10, 2017  (JP) ............................ JP2017-046144
Dec. 14, 2017  (JP) ............................ JP2017-239291

(51) Int. Cl.
*G01S 15/00*    (2020.01)
*G01S 15/42*    (2006.01)
(Continued)

(52) U.S. Cl.
CPC .......... *G01S 15/42* (2013.01); *G01S 7/52019* (2013.01); *G01S 15/89* (2013.01); *G01S 15/96* (2013.01)

(58) Field of Classification Search
USPC ......................................................... 367/99
See application file for complete search history.

(56) References Cited

U.S. PATENT DOCUMENTS 2,871,459 A    1/1959  Berry
3,723,955 A    3/1973  Lyons et al.
(Continued)

FOREIGN PATENT DOCUMENTS

CN    105549022 A     5/2016
DE    102 25 614 A1   12/2003
(Continued)

OTHER PUBLICATIONS

English Machine Translation of JP-2012-529047 (Year: 2012).*
(Continued)

*Primary Examiner* — James R Hulka
(74) *Attorney, Agent, or Firm* — Studebaker & Brackett PC

(57) ABSTRACT

An ultrasonic detecting device may include a transmitter, a receiver, a motor, and processing circuitry. The transmitter may transmit a sequence including a first pulse wave and a second pulse wave separated by a time interval shorter than a time required for an ultrasonic wave to make a round trip underwater to a detection range. The receiver may convert reflection waves of the first and second pulse waves into echo signals. The motor may rotate the receiver. The processing circuitry may acquire, from the echo signals, a first echo signal and a second echo signal, generate first image data based on the first echo signals and second image data based on the second echo signals, and generate synthesized image data based on an angular position of the receiver when the first image data is generated, and an angular position of the receiver when the second image data is generated.

18 Claims, 27 Drawing Sheets

(51) Int. Cl.
  *G01S 7/52* (2006.01)
  *G01S 15/89* (2006.01)
  *G01S 15/96* (2006.01)

(56) References Cited

U.S. PATENT DOCUMENTS

| | | | |
|---|---|---|---|
| 4,119,940 | A | 10/1978 | Keating et al. |
| 4,322,974 | A | 4/1982 | Abele et al. |
| 4,403,314 | A | 9/1983 | Tournois |
| 4,870,628 | A | 9/1989 | Zielinski |
| 5,163,026 | A | 11/1992 | Peynaud |
| 5,260,912 | A | 11/1993 | Latham |
| 5,598,206 | A | 1/1997 | Bullis |
| 5,966,169 | A | 10/1999 | Bullis |
| 6,778,468 | B1 | 8/2004 | Nishimori et al. |
| 7,289,390 | B2 * | 10/2007 | Nishimori ............. G01S 15/107 367/103 |
| 7,388,809 | B2 * | 6/2008 | Inouchi ................. G01S 7/527 367/98 |
| 8,102,733 | B2 | 1/2012 | Rapp et al. |
| 9,941,989 | B2 * | 4/2018 | Zemp ................... G01S 15/8959 |
| 10,247,815 | B1 * | 4/2019 | Koubiadis ............. G01S 7/2813 |
| 10,247,822 | B2 * | 4/2019 | Proctor ................ G01S 15/8902 |
| 10,605,913 | B2 * | 3/2020 | Coleman ............... G01S 15/102 |
| 2006/0013066 | A1 | 1/2006 | Nishimori et al. |
| 2006/0239119 | A1 | 10/2006 | Hartka et al. |
| 2008/0080316 | A1 | 4/2008 | Inouchi et al. |
| 2010/0245154 | A1 | 9/2010 | Szajnowski |
| 2012/0063645 | A1 * | 3/2012 | Lindholm ............ G01S 15/8902 382/106 |
| 2016/0065323 | A1 | 3/2016 | Zemp |
| 2016/0131759 | A1 | 5/2016 | Kozuki |
| 2016/0131760 | A1 * | 5/2016 | Kozuki ................ G01S 15/34 367/102 |
| 2016/0377716 | A1 | 12/2016 | Proctor et al. |
| 2017/0123062 | A1 | 5/2017 | Coleman et al. |
| 2018/0011190 | A1 | 1/2018 | Morales et al. |

FOREIGN PATENT DOCUMENTS

| | | | | |
|---|---|---|---|---|
| EP | 3018494 A1 * | 5/2016 | ............. | G01S 7/521 |
| EP | 3 425 424 A1 | 1/2019 | | |
| JP | S55-86974 U | 6/1980 | | |
| JP | 04064076 A * | 2/1992 | | |
| JP | H04-64076 A | 2/1992 | | |
| JP | H04-238287 A | 8/1992 | | |
| JP | 2002-202362 A | 7/2002 | | |
| JP | 2002202362 A * | 7/2002 | ............. | G01S 15/96 |
| JP | 2006-129335 A | 5/2006 | | |
| JP | 2008-58040 A | 3/2008 | | |
| JP | 2008058040 A * | 3/2008 | | |
| JP | 2011-191141 A | 9/2011 | | |
| JP | 2012-529047 A | 11/2012 | | |
| JP | 2016-090453 A | 5/2016 | | |
| JP | 2016090453 A * | 5/2016 | ............. | G01S 15/34 |
| JP | 2017-166880 A | 9/2017 | | |
| JP | 2018-009853 A | 1/2018 | | |
| WO | WO-2010141011 A1 * | 12/2010 | ............. | G01S 15/86 |
| WO | 2018-163844 A1 | 9/2018 | | |

OTHER PUBLICATIONS

Sunwest Technologies, "CTFM Sonar SS330", [online], [Searched on Dec. 27, 2016], the Internet <http://www.sunwest-tech.com/SS300%20Broch%20-%20REV%20G.pdf>.

Acoustical Society of America, "Paradigm Shift of Underwater Echo Sounding Technology", [online], [Searched on Dec. 27, 2016], the Internet <http://asa.scitation.org/doi/abs/10.1121/1.4970448>.

HydroSweep DS Deep-Sea Multibeam Echosounder, Teledyne RESON, [online] www.teledyne-reson.com.

HydroSweep MD/30 Medium Depth Multibeam Echosounder, Teledyne RESON, [Online] www.teledynemarine.com.

HydroSweep MD/50 Shallow to Medium Depth Multibeam Echosounder, Teledyne RESON, [Online] www.teledynemarine.com.

Borenstein et al., "Noise Rejection for Ultrasonic Sensors in Mobile Robot Applications," Proceedings of the 1992 IEEE International Conference on Robotics and Automation, Nice, France, May 1992, pp. 1727-1732.

Kleeman et al.. Sonar Sensing, Chapter 21 pp. 491-519, Springer Handbook of Robotics, 2008.

EdgeTech high-speed, high-resolution sonar for MMT Surveyor Interceptor, UCi—The Magazine for Underwater Professionals, Underwater World Publications Ltd, Mar./Apr. 2015.

International Search Report issued in PCT/JP2018/006434; dated Apr. 17, 2018.

The extended European search report issued by the European Patent Office on Dec. 4, 2020, which corresponds to European Patent Application No. 18764593.2-1206 and is related to U.S. Appl. No. 16/491,267.

* cited by examiner

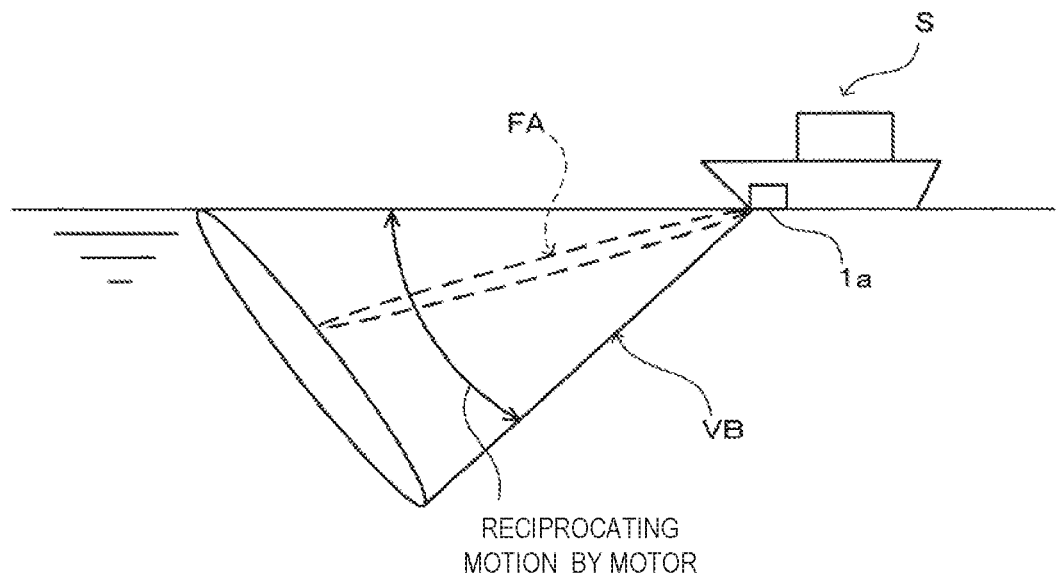
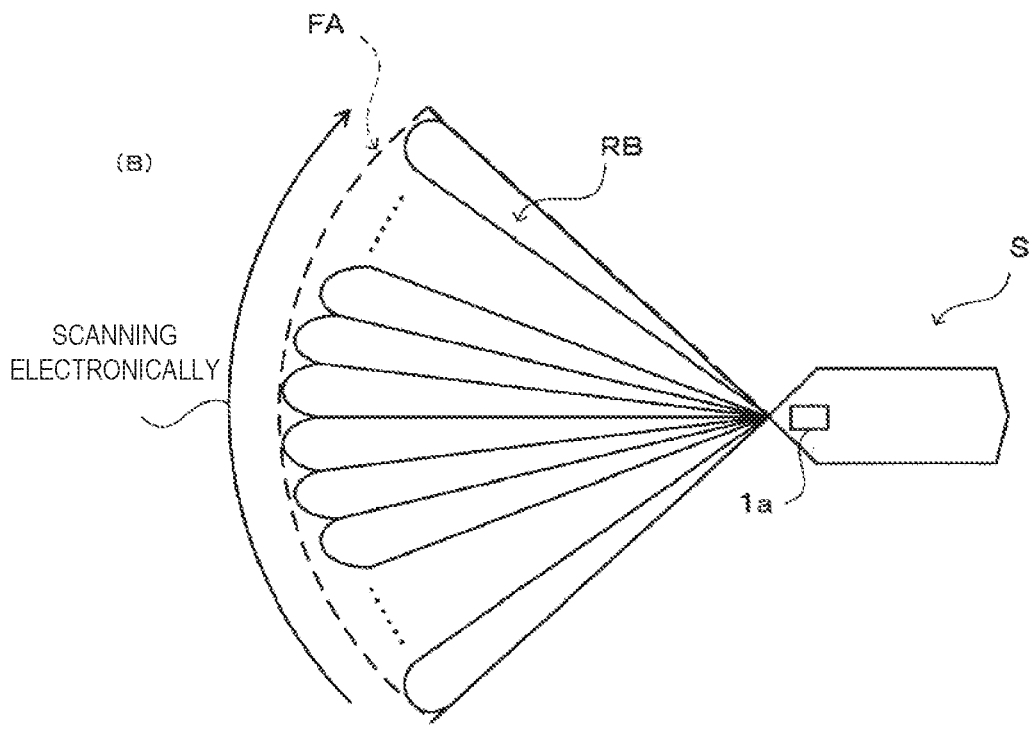
FIG. 16

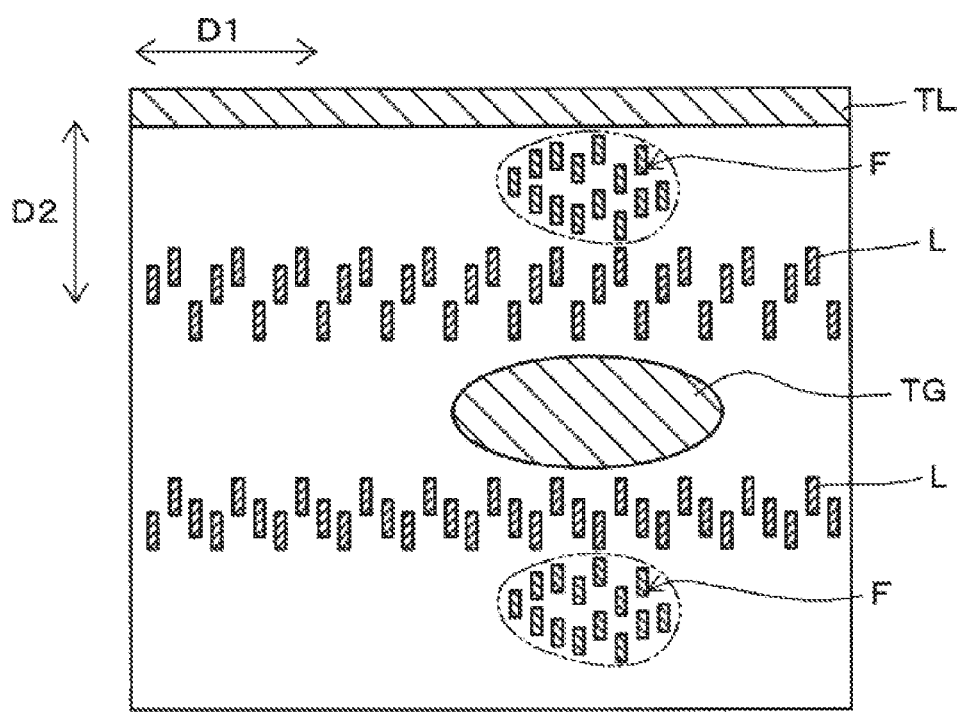
2ND EMBODIMENT
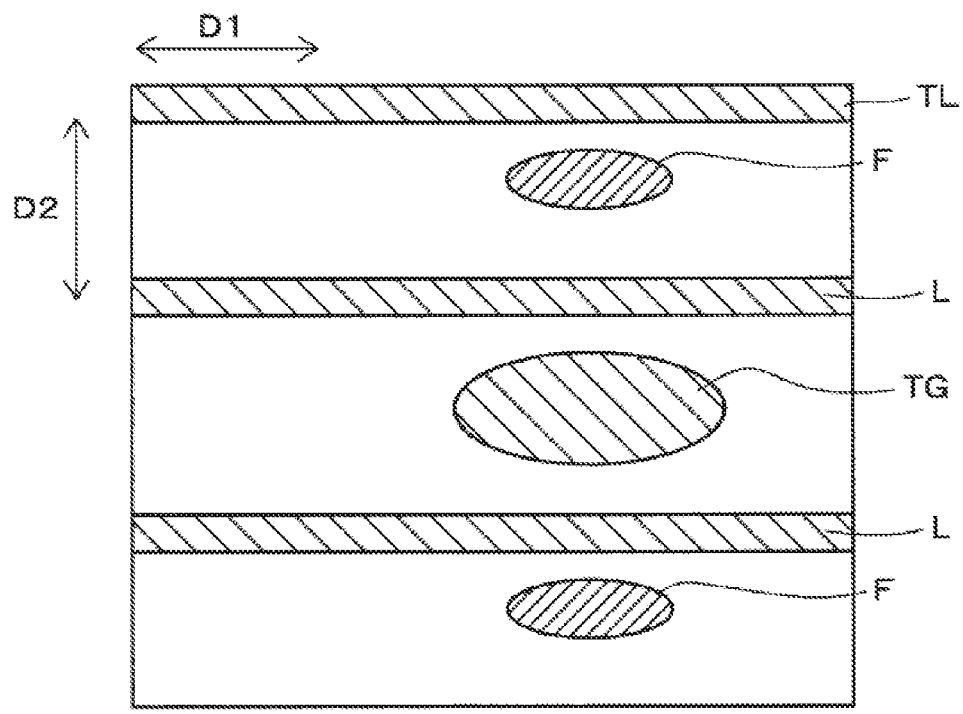
COMPARATIVE EXAMPLE
FIG. 22

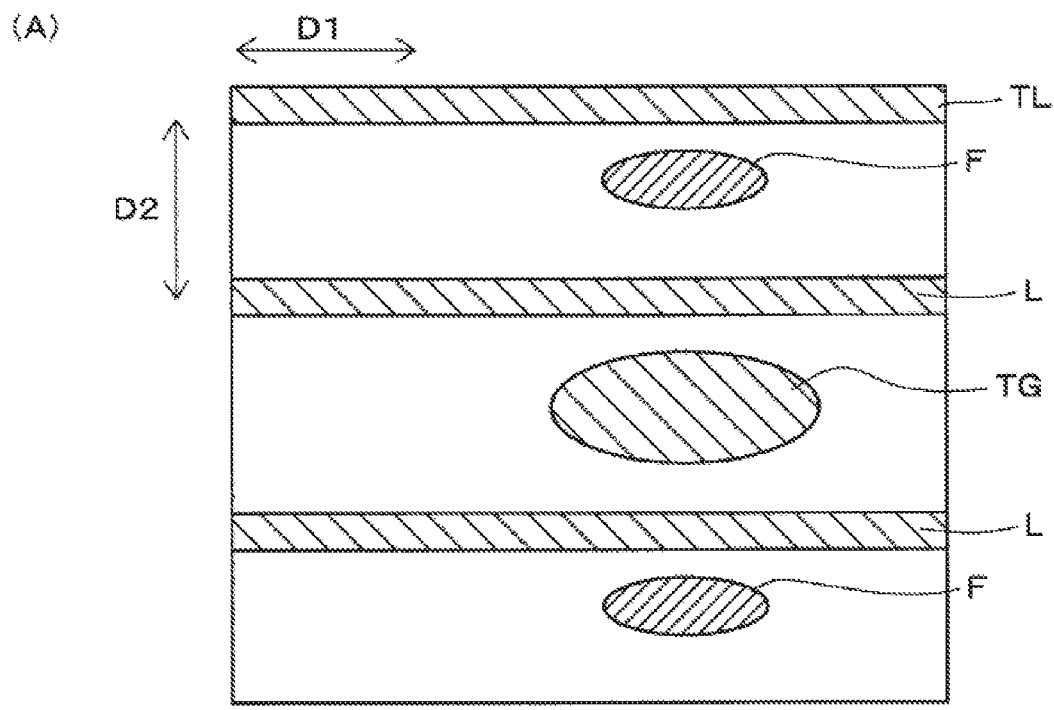
BEFORE RANDOMIZING AND SMOOTHING
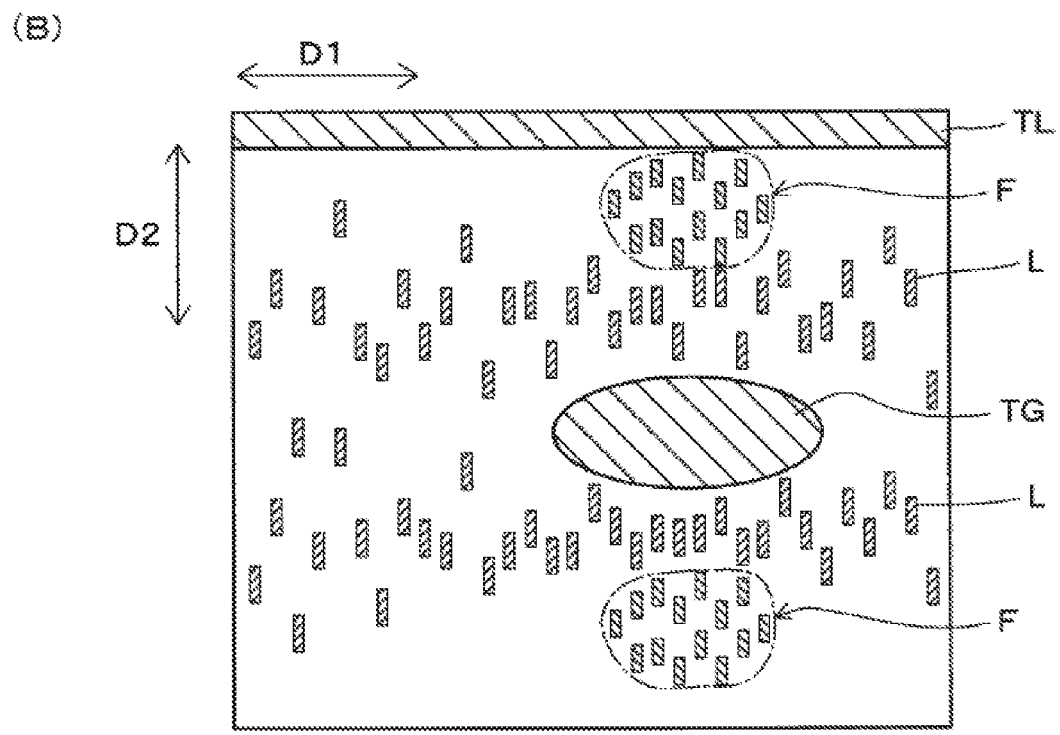
AFTER RANDOMIZING AND SMOOTHING
FIG. 25

ULTRASONIC DETECTING DEVICE AND ULTRASONIC DETECTING METHOD

CROSS-REFERENCE TO RELATED APPLICATION(S)

This application claims priority to PCT Application No. PCT/JP2018/006434, filed Feb. 22, 2018 which claims the benefit of Japanese Patent Application No. JP2017-046144, filed Mar. 10, 2017 and Japanese Patent Application No. JP2017-239291, filed Dec. 14, 2017. The entire contents of the above-identified applications are hereby incorporated by reference herein.

TECHNICAL FIELD

The present disclosure relates to an ultrasonic detecting device and an ultrasonic detecting method which detect a 3D position of a target object.

BACKGROUND ART

Conventionally, a scanning sonar is known, which can perform a target object detection within a given range in a comparatively short period of time, by performing, with an array arranged two-dimensionally or three-dimensionally, a beamforming of echoes of transmission waves transmitted in all azimuth directions.

Moreover, a so-called PPI sonar is also generally known, which can detect a target object around a ship by swiveling an ultrasonic transducer capable of forming a comparatively narrow beam.

Moreover, Patent Document 1 discloses a sonar system which utilizes a so-called a multi-ping type.

Moreover, Patent Document 2 discloses that an interval of transmission pulse waves is randomized, in order to reduce the influences to surrounding underwater sound apparatuses.

Moreover, Patent Document 3 discloses a technology capable of detecting a 3D space by using the interferometric method while mechanically rotating a transducer array including at least two transducer elements which can transmit pulse waves.

Moreover, Nonpatent Document 1 discloses a sonar provided with a transmitting element which can form a beam which spreads in a fan shape (a so-called "fan beam"), and a receiving element which can form a beam which is comparatively narrow (a so-called "pencil beam"). This document discloses a technology capable of detecting a 2D space in a comparatively short period of time by using the CTFM method, while mechanically rotating the transmitting element and the receiving element.

Moreover, Nonpatent Document 2 discloses a technology capable of shortening an updating cycle of an echo image by using a code called "gold code".

REFERENCE DOCUMENTS OF CONVENTIONAL ART

Patent Documents

[Patent Document 1] U.S. Pat. No. 5,163,026A
[Patent Document 2] U.S. Pat. No. 5,260,912A
[Patent Document 3] US2016/0377716A1

Nonpatent Documents

[Nonpatent Document 1] SUNWEST TECHNOLOGIES, "CTFM Sonar SS330", [online], [Searched on Dec. 27, 2016], the Internet <http://www.sunwest-tech.com/SS300%20Broch %20-%20REV %20G.pdf>
[Nonpatent Document 2] Acoustical Society of America, "Paradigm Shift of Underwater Echo Sounding Technology", [online], [Searched on Dec. 27, 2016], the Internet <http://asa.scitation.org/doi/abs/10.1121/1.4970448>

DESCRIPTION OF THE DISCLOSURE

Problems to be Solved by the Disclosure

However, it is necessary for the scanning sonar described above to be provided with many elements in order to form the array arranged two-dimensionally or three-dimensionally, and therefore, the cost of the product increases.

Moreover, the detection devices disclosed in the PPI sonar described above, Patent Document 1, Nonpatent Document 1, and Nonpatent Document 2 can detect a 2D area, but cannot detect a 3D area.

Moreover, in the sonar using the CTFM method described above, since a continuous wave is transmitted, the influence of the interference to the surrounding underwater detection devices becomes larger.

The present disclosure is to solve the problems described above, and one purpose thereof is to provide an ultrasonic detecting device and an ultrasonic detecting method, which can detect a 3D position of a target object in a comparatively short period of time at low cost.

SUMMARY OF THE DISCLOSURE

In order to solve the problem described above, an ultrasonic detecting device according to one aspect of the present disclosure is an ultrasonic detecting device for detecting target object within a given detection range. The device may include a transmitter, a receiver, a motor, and processing circuitry. The transmitter may transmit a first sequence including a first pulse wave in a first frequency band and a second pulse wave in a second frequency band, the second frequency band being a different frequency band from the first frequency band, a time interval between the first pulse wave and the second pulse wave being set to a first time interval, the first time interval being shorter than a time for ultrasound in water to make a round trip to the detection range. The receiver may comprise a plurality of receiving elements, each receiving element of the plurality of receiving elements receiving a reflection wave of the first pulse wave and the second pulse wave, and each receiving element of the plurality of receiving elements converting the reflection wave into an echo signal. The motor may rotate at least the receiver. The processing circuitry may retrieve a first echo signal and a second echo signal from the echo signal, the first echo signal being retrieved from a frequency band corresponding to the first frequency band and the second echo signal being retrieved from a frequency band corresponding to the second frequency band, generate a first image data and a second image data, the first image data being generated by performing a beamforming based on each first echo signal retrieved from the plurality of receiving elements, the second image data being generated by performing a beamforming based on each second echo signal retrieved from the plurality of receiving elements, and generate a synthesized image data by synthesizing the first image data and the second image data based on an angular position of the receiver rotated by the motor when the first image data is generated and an angular position of the receiver rotated by the motor when the second image data is generated.

The transmitter may transmit a second sequence after transmitting the first sequence, the second sequence including a third pulse wave in a third frequency band and a fourth pulse wave in a fourth frequency band, the fourth frequency band being a different frequency band from the third frequency band. A time interval between the third pulse wave and the fourth pulse wave may be set to a second time interval, the second time interval being shorter than a time for ultrasound in water to make a round trip to the detection range. The second time interval may be different from the first time interval.

In order to solve the problem described above, an ultrasonic detecting device according to another aspect of the present disclosure is an ultrasonic detecting device for detecting target object within a given detection range. The device may include a transmitter, a receiver, and processing circuitry. The transmitter may transmit a plurality of sequences, each sequence of the plurality of sequences including a first pulse wave in a first frequency band and a second pulse wave in a second frequency band, the second frequency band being a different frequency band from the first frequency band, a time interval between the first pulse wave and the second pulse wave being shorter than a time for ultrasound in water to make a round trip to the detection range, and the time interval being different in two sequences of the plurality of sequences. The receiver may comprise a receiving element that receives a reflection wave of the first pulse wave and the second pulse wave, and that converts the reflection wave into an echo signal. The processing circuitry may retrieve a first echo signal and a second echo signal from the echo signal, the first echo signal being retrieved from a frequency band corresponding to the first frequency band and the second echo signal being retrieved from a frequency band corresponding to the second frequency band, and generate a first image data and a second image data, the first image data being generated based on the first echo signal, the second image data being generated based on the second echo signal.

Further, in order to solve the problem described above, an ultrasonic detecting method according to one aspect of the present disclosure is an ultrasonic detecting method for detecting target object within a given detection range. The method may include transmitting a first sequence including a first pulse wave in a first frequency band and a second pulse wave in a second frequency band, the second frequency band being a different frequency band from the first frequency band, a time interval between the first pulse wave and the second pulse wave being set to a first time interval, the first time interval being shorter than a time for ultrasound in water to make a round trip to the detection range, receiving a reflection wave of the first pulse wave and the second pulse wave with each receiving element of a plurality of receiving elements and converting the reflection wave of each receiving element into an echo signal, rotating at least a receiver comprising the plurality of receiving elements, retrieving a first echo signal and a second echo signal from the echo signal, the first echo signal being retrieved from a frequency band corresponding to the first frequency band and the second echo signal being retrieved from a frequency band corresponding to the second frequency band, generating a first image data and a second image data, the first image data being generated by performing a beamforming based on each first echo signal retrieved from the plurality of receiving elements, the second image data being generated by performing a beamforming based on each second echo signal retrieved from the plurality of receiving elements; and generating a synthesized image data by synthesizing the first image data and the second image data based on an angular position of the receiver when the first image data is generated and an angular position of the receiver when the second image data is generated.

According to the present disclosure, the ultrasonic detecting device and the ultrasonic detecting method capable of detecting a 3D position of the target object in a comparatively short period of time can be provided at low cost.

BRIEF DESCRIPTION OF DRAWINGS

FIGS. 16(A) and 16(B) are schematic views illustrating a transmission beam and a reception beam formed by the underwater detection device according to the modification, together with a ship S on which the underwater detection device is mounted, and FIG. 16(A) is a view seen from the side and FIG. 16(B) is a view seen from above.

FIG. 22(A) is an image generated based on an image data generating module, and is a view illustrating one example of the image displayed on a display unit, and FIG. 22(B) is an image generated based on the image data generating module when a transmission interval of the transmission pulse waves is single kind, and is a view illustrating a comparative example of the image displayed on the display unit.

FIG. 25(A) is a view illustrating one example of a detection image before performing randomizing and smoothing, and FIG. 25(B) is a view illustrating one example of the detection image after performing the randomizing and the smoothing.

DETAILED DESCRIPTION

First Embodiment

Hereinafter, an underwater detection device which serves as an ultrasonic detecting device according to one embodiment of the present disclosure will be described with reference to the drawings. An underwater detection device 1 according to this embodiment of the present disclosure is a so-called underwater detection device of the multi-ping type. The multi-ping type may also be called a multi-pulse type.

For example, in a common underwater detection device of a pulse type, after transmitting a transmission pulse wave, while the transmission pulse wave goes and comes back in a detection range, a receiver may receive a reflection wave of the transmission pulse wave. After a time required for the transmission pulse wave going and coming back in the detection range is lapsed, a subsequent transmission pulse wave may be transmitted. On the other hand, in the underwater detection device of the multi-ping type, after a transmission pulse wave at a given frequency band is transmitted first, a subsequent transmission pulse wave at a different frequency band from the given frequency band may be transmitted before the transmission pulse wave goes and comes back in the detection range. The reflection wave of each transmission pulse wave may be extracted by a filter corresponding to each frequency band. Thus, according to the underwater detection device of the multi-ping type, since a transmission interval of the transmission pulse wave can be shortened, a detection speed of a target object can be increased, compared with the common underwater detection device of the pulse type.

The underwater detection device 1 is mounted, for example, to the bottom of the hull of the ship, and may be mainly used for detection of target objects, such as fish and schools of fish. In addition, it may be also used for detecting ups and downs of the seabed, such as a reef, a structure, such as an artificial fish reef, etc. Moreover, according to this underwater detection device 1, a 3D position and the shape of the target object can be grasped as will be described later in detail.

[Entire Configuration]

Figure 1:
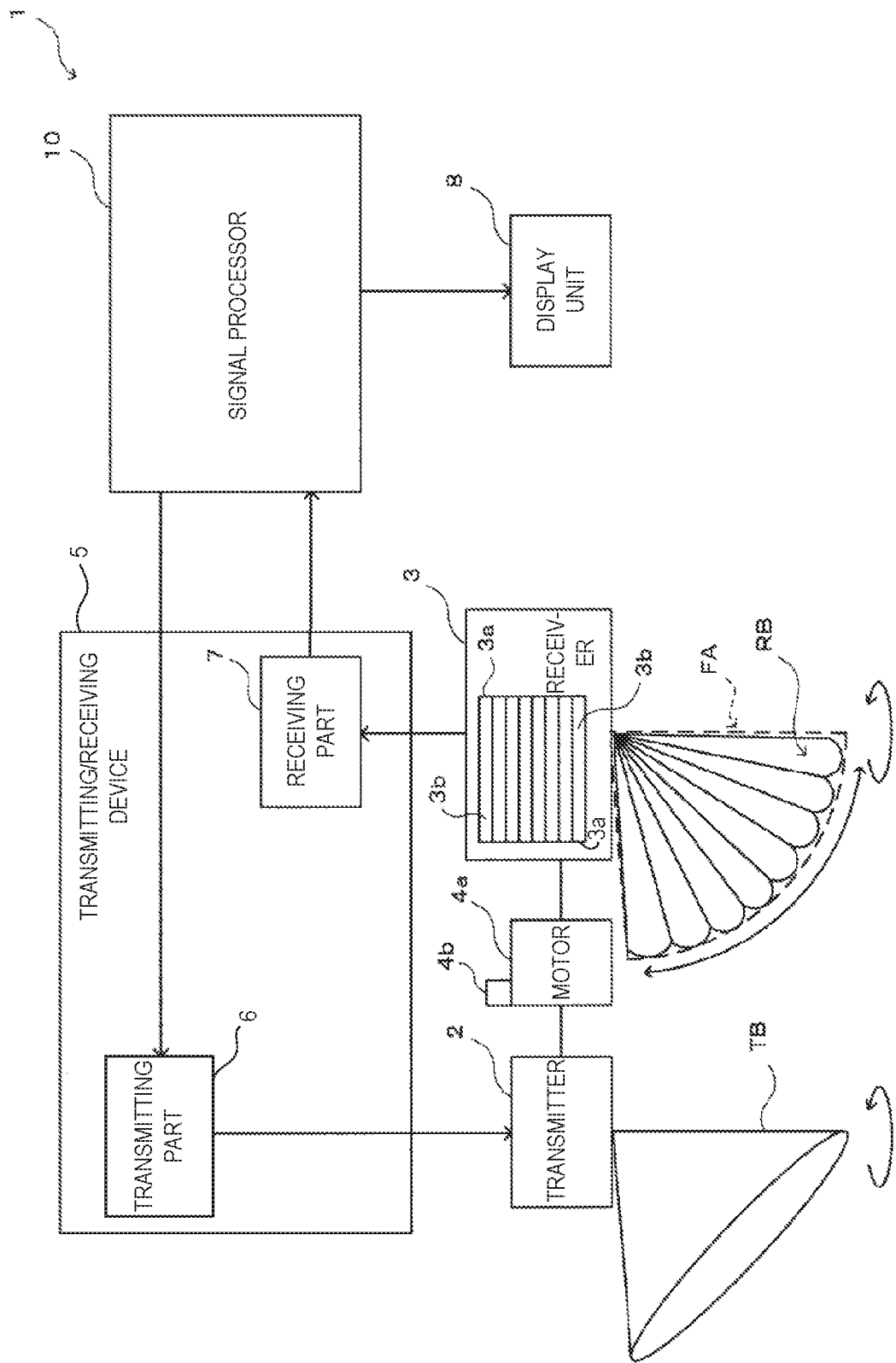
FIG. 1 is a block diagram illustrating a configuration of an underwater detection device according to a first embodiment of the present disclosure.

FIG. 1 is a block diagram illustrating a configuration of the underwater detection device 1 according to the first embodiment of the present disclosure. As illustrated in FIG. 1, the underwater detection device 1 may include a transmitter 2, a receiver 3, and a motor 4a as a rotation driving part, a rotational angle detector 4b, a transmitting/receiving device 5, a signal processor 10, and a display unit 8.

Figure 2:
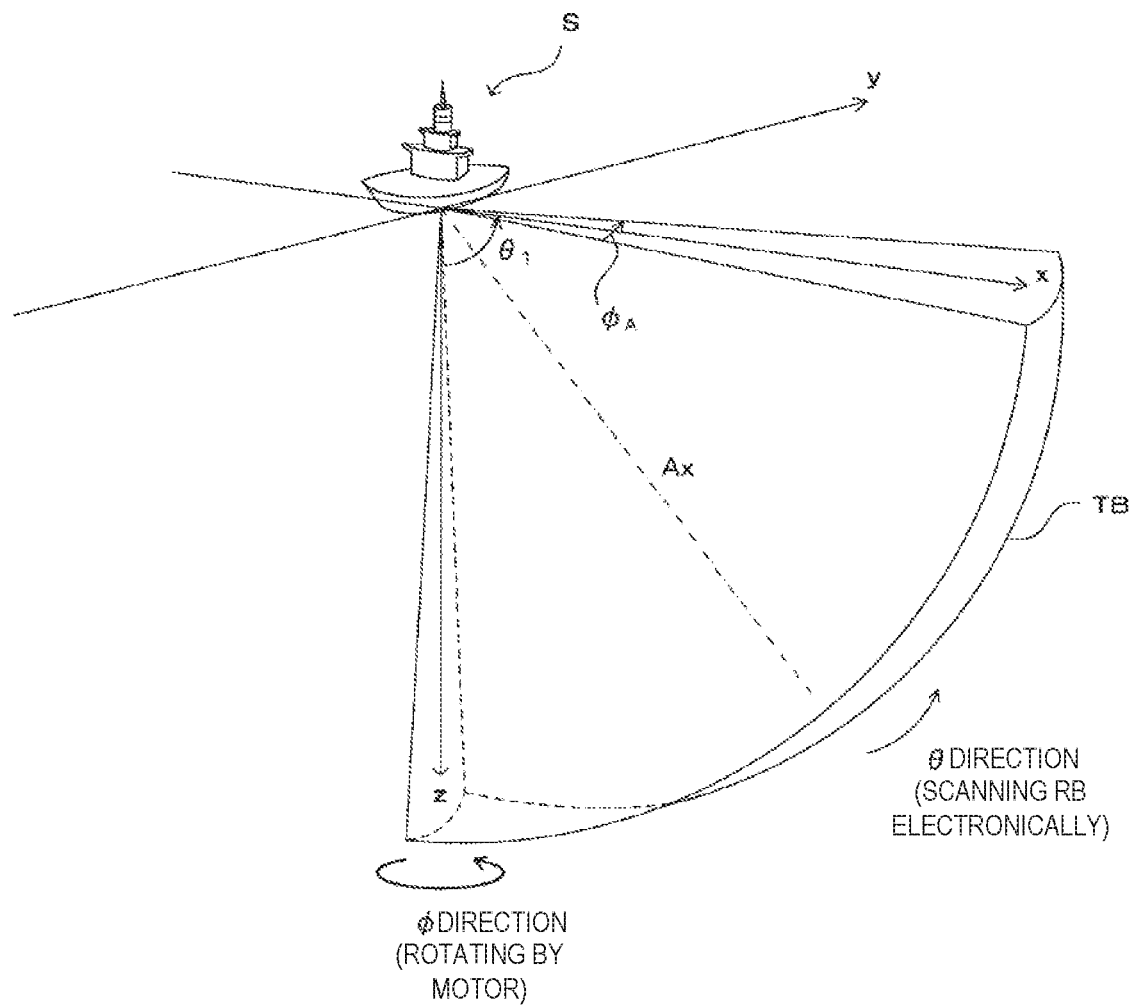
FIG. 2 is a view schematically illustrating a transmission beam formed by a transmitter.

FIG. 2 is a view schematically illustrating a transmission beam TB formed by the transmitter 2. The transmitter 2 may transmit a pulse-shaped ultrasonic wave underwater, and may be provided to the ship's bottom so that a transmitting surface from which the ultrasonic wave is transmitted is exposed underwater. The transmitter 2 may have one or more ultrasonic transducers, and may be configured to form the 3D transmission beam TB as illustrated in FIG. 2. The transmitter 2 may be provided to the ship's bottom so that a center axis Ax of the transmission beam TB is obliquely oriented with respect to the vertical direction (z-axis direction in FIG. 2). As illustrated in FIG. 2, for example, the transmission beam TB has a certain thickness (angle $\varphi_A$) when seen vertically, and has a substantially sector shape when seen in the thickness direction. Although this angle $\varphi_A$ is, for example, 30°, but it may be within a range of 6° to 90° without being limited to 30°. A possible angle range $\theta_1$ of the transmission beam TB of the fan shape in the vertical direction is, for example, when the vertically downward is set as 0°, an angle range from 0° (vertically downward) to 90° (horizontal). However, without being limited to the angle range, the angle range $\theta_1$ may be an angle range from 30° to 90° (horizontal), or may be an angle range from 45° to 90° (horizontal). Alternatively, the angle range $\theta_1$ may be an angle range from −60° to 60° which is an angle range including the vertically downward.

Figure 3:
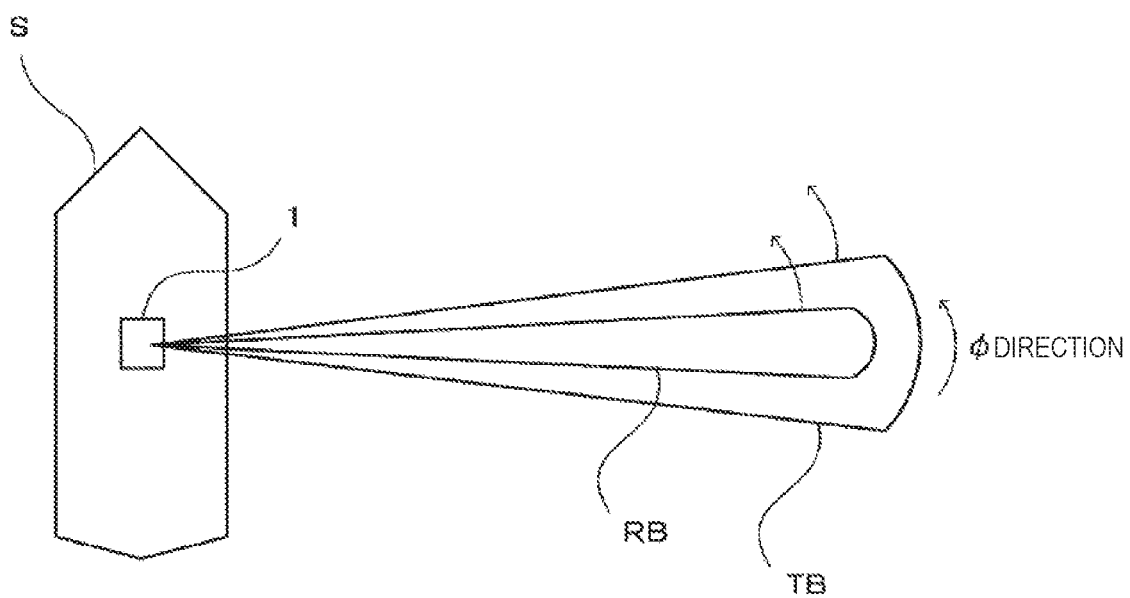
FIG. 3 is a view of a ship, on which the underwater detection device is mounted seen from above, and is a view schematically illustrating the transmission beam formed by the transmitter and a reception beam.

FIG. 3 is a view of a ship S, on which the underwater detection device 1 is mounted seen from above, and is a view schematically illustrating the transmission beam TB formed by the transmitter 2 and a reception beam RB. The motor 4a may move the transmitter 2 and the receiver 3. In detail, the motor 4a may rotate the transmitter 2 and the receiver 3 centering on a center axis extending in the vertical direction, as a rotation center. Thus, the transmission beam TB illustrated in FIG. 3 is rotated in all the horizontal azimuth directions centering on the ship S. The motor 4a may continuously rotate the transmitter 2 and the receiver 3. However, without being limited to this configuration, the motor 4a may repeat rotation and stop of the transmitter 2 and the receiver 3 so that the transmitter 2 and the receiver 3 repeat an operation in which the transmitter 2 and the receiver 3 rotate by a given angle at a given time interval and stop for a given period of time after the rotation.

Moreover, the rotational angle detector 4b may be attached to the motor 4a. As the rotational angle detector 4b, an encoder is used, for example. However, without being limited to this configuration, a signal for controlling rotation of the motor 4a may be analyzed to convert the signal into angle information. In detail, if a stepping motor is used as the motor 4a, the number of instruction pulses inputted into the stepping motor may be counted to convert it into the angle information. In the underwater detection device 1, an angular position of the transmitter 2 and the receiver 3 in the φ direction may be calculated based on a rotation angle of the motor 4a detected by the rotational angle detector 4b.

Figure 4:
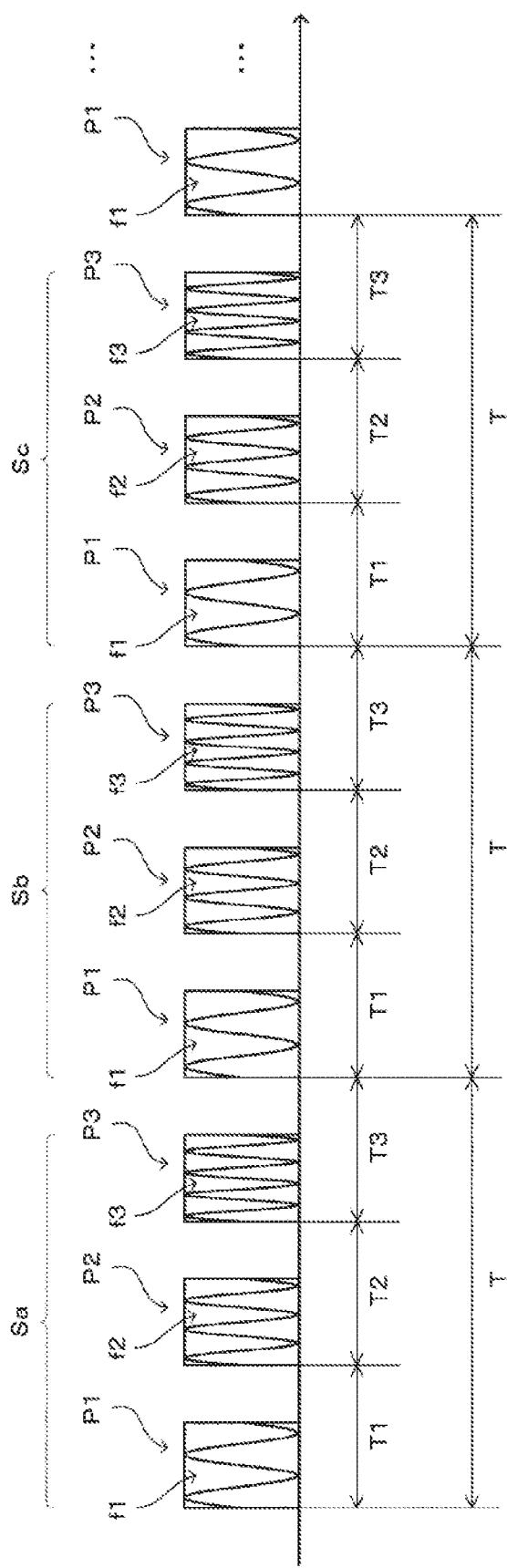
FIG. 4 is a view illustrating a pulse wave transmitted from the transmitter.

FIG. 4 is a view illustrating the transmission pulse wave transmitted from the transmitter 2. From the transmitter 2, a first transmission pulse wave P1, a second transmission pulse wave P2, and a third transmission pulse wave P3, which are obtained by converting first to third amplified transmission pulse signals sequentially outputted from a transmitting part 6 described later in detail into the ultrasonic waves, respectively, may be transmitted. The transmission pulse waves P1, P2, and P3 may be comprised of pulse waves at different frequency bands. From the transmitter 2, sequences (in FIG. 4, only three sequences Sa, Sb, and Sc are illustrated) including the first transmission pulse wave P1, the second transmission pulse wave P2, and the third transmission pulse wave P3 may repeatedly be transmitted at a constant cycle T. In this embodiment, time intervals T1, T2, and T3 of the transmission pulse waves may be the same. In detail, the time intervals T1, T2, and T3 of the transmission pulse waves may be T/3. Note that a repeating waveform which constitutes the transmission pulse waves is schematically illustrated in FIG. 4. Moreover, although, here, the example in which the three transmission pulse waves at different frequency bands are included in one sequence is described, the present disclosure is not limited to this configuration. In detail, two transmission pulse waves at different frequency bands, of which the time intervals of the transmission pulses are set to be T/2, may be included in one sequence. Alternatively, four transmission pulse waves at different frequency bands, of which the time intervals of the transmission pulses are set to be T/4, may be included in one sequence. Alternatively, five or more transmission pulse waves may be included in one sequence.

Moreover, among the adjacent sequences in time in the sequences sequentially transmitted from the transmitter 2, the sequence outputted first may be referred to as a first sequence, and the sequence outputted next may be referred to as a second sequence. In detail, referring to FIG. 4, in a relation between a sequence Sa and a sequence Sb, Sa may be the first sequence, and Sb may be the second sequence. Moreover, in a relation between the sequence Sb and the sequence Sc, Sb may be the first sequence, and Sc may be the second sequence.

Each sequence may be transmitted at the same cycle T. The cycle T of the sequence may be set as a period of time between a transmission of the ultrasonic wave from the transmitter 2 and a return of the ultrasonic wave to the receiver 3 after it travels over a detection range R which is a distance at which the target object is detected by the underwater detection device 1 according to this embodiment. In other words, the cycle T of the sequence may be set as a time required for the ultrasonic wave to go and come back (i.e., make a round trip) in the detection range R. That is, in the underwater detection device 1 according to this embodiment, the time intervals T1, T2, and T3 of the transmission pulse waves may be set as a shorter time interval (also referred to as a "first time interval") than the time required for the ultrasonic wave to go and come back underwater in the detection range R.

Note that, referring to FIG. 4, the transmission pulse wave P1 included in the first sequence (for example, the sequence Sa) may be the first pulse wave, and the transmission pulse wave P2 included in the sequence Sa may be the second pulse wave. Moreover, the transmission pulse wave P1 included in the second sequence (for example, the sequence Sb) may be a third pulse wave, and the transmission pulse wave P2 included in the sequence Sb may be a fourth pulse wave. Moreover, the pulse signal used as the basis of the first pulse wave may be a first pulse signal, the pulse signal used as the basis of the second pulse wave may be a second pulse signal, the pulse signal used as the basis of the third pulse wave may be a third pulse signal, and the pulse signal used as the basis of the fourth pulse signal may be a fourth pulse signal. In this embodiment, although the frequency band of the first pulse wave and the frequency band of the third pulse wave are set identically, they may be set as different frequency bands without being limited to the configuration. Moreover, in this embodiment, although the frequency band of the second pulse wave and the frequency band of the fourth pulse wave are set identically, they may be set as different frequency bands without being limited to the configuration. Moreover, in the relation between the first sequence (for example, the sequence Sa) and the second sequence (for example, the sequence Sb), the frequency band of the transmission pulse wave P1 included in the first sequence Sa may be a first frequency band, the frequency band of the transmission pulse wave P2 included in the first sequence Sa may be a second frequency band, the frequency band of the transmission pulse wave P1 included in the second sequence Sb may be a third frequency band, and the frequency band of the transmission pulse wave P2 included in the second sequence Sb may be a fourth frequency band.

The receiver 3 may have a plurality of ultrasonic transducers 3a as wave receiving elements. The receiver 3 may be provided separately from the transmitter 2. In each ultrasonic transducer 3a, a wave receiving surface 3b by which the ultrasonic wave is received may be exposed underwater. The wave receiving surface 3b provided to each ultrasonic transducer 3a may be formed in a rectangular shape, as illustrated in FIG. 1. Note that, although the number of ultrasonic transducers 3a is eight in FIG. 1, the number may be other number without being limited to eight. Moreover, in FIG. 1, the shape and the orientation of each wave receiving surface 3b are illustrated schematically. Each ultrasonic transducer 3a may receive the reflection wave of each transmission pulse wave which is the ultrasonic wave transmitted from the transmitter 2 as a reception wave, and may convert it into an echo signal as an electrical signal. These ultrasonic transducers 3a may be arranged linearly. That is, the receiver 3 may be a linear array. An angle formed by a direction perpendicular to the wave receiving surface of the linear array, i.e., a direction in which the reception beam is formed, and a horizontal plane is, if a direction of an angle of depression is set as positive, 30°, for example. Note that this angle may be any angle, as long as it is within a range from 0° which is an angle in a case where the linear array is arranged in the vertical direction to 90° which is an angle in a case where the linear array is arranged horizontally.

The receiver 3 may be driven and rotated by the motor 4a. In detail, the motor 4a may rotate the receiver 3 centering on the center axis extending in the vertical direction as a rotation center. Thus, the receiver 3 may rotate along the horizontal plane perpendicular to the vertical direction. The motor 4a may continuously rotate the receiver 3. However, without being limited to this configuration, the motor 4a may repeat the rotation and the stop so that the receiver 3 repeats the operation in which it rotates by the given angle at every given time interval and stops for the given period of time after the rotation. The motor 4a may rotate the transmitter 2 and the receiver 3 synchronizedly. That is, the transmitter 2 and the receiver 3 may not move relative to each other.

Figure 5:
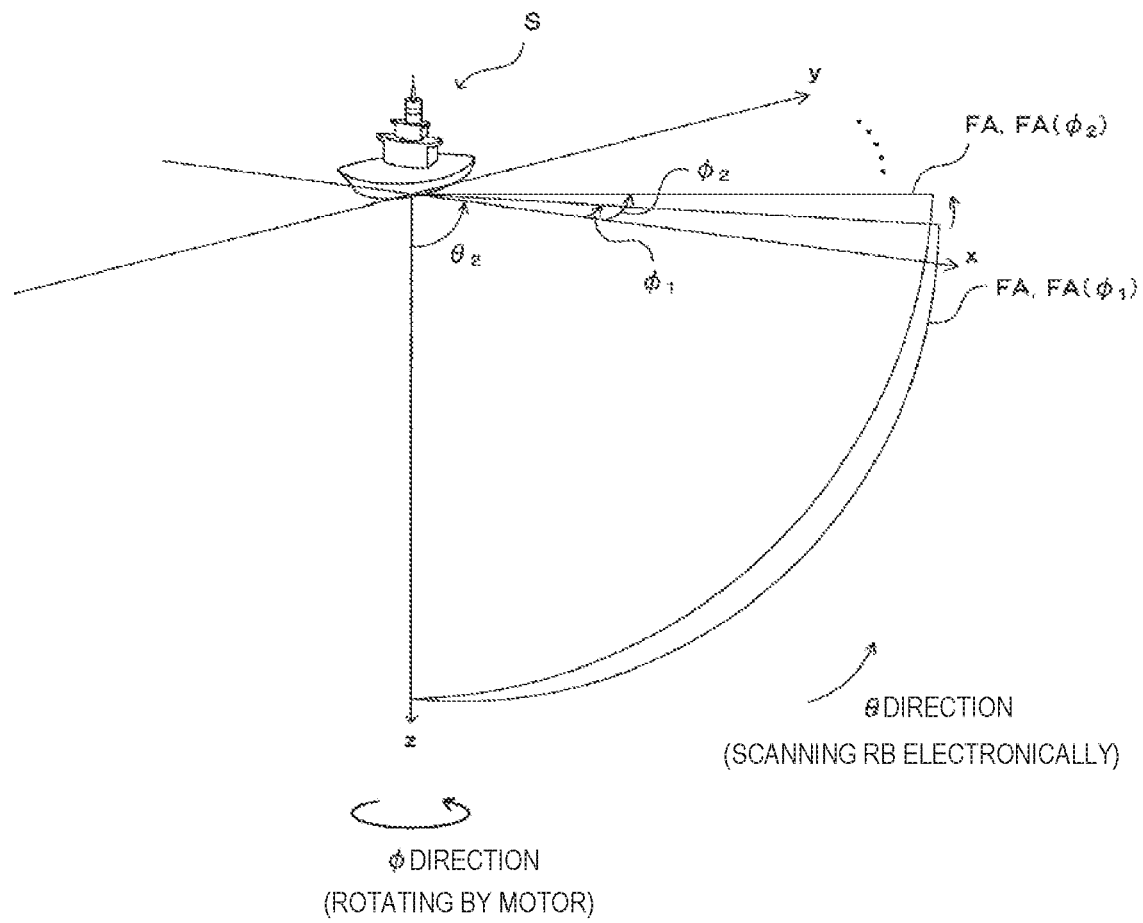
FIG. 5 is a view schematically illustrating a fan area which is a range where the reception beam is scanned electronically.

Moreover, as described above, the rotational angle detector 4b may be attached to the motor 4a. In the underwater detection device 1, the angular position in the φ direction of the receiver 3 may be calculated based on the rotation angle of the motor 4a detected by the rotational angle detector 4b. Note that, in this embodiment, the angular position of the receiver 3 may be set as an angle of a fan area FA formed by the receiver 3 with respect to a given azimuth direction (for example, x-axis) when seen from above. In FIG. 5, the fan area FA when the angular position is a first angular position $\varphi_1$ is expressed by FA($\varphi_1$), and the fan area FA when the angular position is a second angular position $\varphi_2$ is expressed by FA($\varphi_2$).

FIG. 5 is a view schematically illustrating the fan area FA which is a range where the reception beam RB is scanned electronically. The receiver 3 of this embodiment may be configured to perform a beamforming together with the transmitting/receiving device 5 and the signal processor 10 which will be described in detail below, to perform the detection, by the narrow reception beam RB (refer to FIG. 1) which scans electronically, within the fan area FA which is the fan-shaped range where the linear array of the receiver 3 has a gain (for example, the range where θ is 0° to 90°, where the vertically downward is 0°. This fan area FA may be formed so as to be comparatively thin, for example, with the thickness when seen in the horizontal direction being about 6°, and as illustrated in FIG. 5, may be formed in the fan shape spreading downwardly along the vertical plane centering on the ship S. In more detail, an angle $\theta_2$ of the fan-shaped fan area FA may be about 90°, for example. The fan area FA may be formed into a range from the vertically downward to the horizontal direction. Referring to FIGS. 3 and 5, the reception beam RB which scans electronically inside the fan area FA may be rotated in the φ direction along the horizontal plane by the motor 4a. In other words, the reception beam RB may be rotated by the motor 4a in a direction perpendicular to a plane where the beamforming is performed (in other words, the fan area FA). Thus, the underwater detection device 1 according to this embodiment can detect the target object within the 3D space covering the large area centering on the ship S, and can estimate the 3D position of the target object in the space. Note that the possible angle range $\theta_2$ of the reception beam RB in the vertical direction may be an angle range from 0° to 90° (horizontal) as one example, where the vertically downward is 0°. However, without being limited to the range, the angle range may be from 30° to 90°, or may be 45° to 90°. Alternatively, the angle range may be −60° to 60° including the vertically downward.

The transmitting/receiving device 5 may include the transmitting part 6 and a receiving part 7.

The transmitting part 6 may amplify the transmission pulse signal generated by the signal processor 10, and apply the amplified signal to the transmitter 2 as an amplified transmission pulse signal. Thus, from the transmitter 2, the transmission pulse waves corresponding to the respective amplified transmission pulse signals may be transmitted. In detail, from the transmitter 2, the first transmission pulse wave corresponding to a first amplified transmission pulse signal, the second transmission pulse wave corresponding to a second amplified transmission pulse signal, and the third transmission pulse wave corresponding to a third amplified transmission pulse signal may be transmitted at a given time interval therebetween.

The receiving part 7 may amplify the echo signal as the electrical signal outputted from the receiver 3, and A/D-convert the amplified echo signal. Then, the receiving part 7 may output the echo signal converted into the digital signal to the signal processor 10. In more detail, the receiving part 7 may have a plurality of reception circuits, each reception circuit may perform the given processing described above to each echo signal acquired by converting the reception wave received by the corresponding ultrasonic transducer 3a into the electrical signal, and then output the echo signal to the signal processor 10.

The signal processor 10 may generate the transmission pulse signal as the transmission signal, and then input it into the transmitting part 6. Moreover, the signal processor 10 may process the echo signal outputted from the receiving part 7, and then perform processing to generate an image data of the target object. The configuration of the signal processor 10 will be described later in detail.

The display unit 8 may display an image according to the image data outputted from the signal processor 10 on the display screen. In this embodiment, the display unit 8 may display an underwater state below the ship as a 3D bird's-eye view. Thus, a user may look at the display screen and can guess the underwater state below the ship (for example, the existence and the positions of a single fish and a school of fish, ups and downs of the seabed, and the structure such as an artificial fish reef).

[Configuration of Signal Processor]

Figure 6:
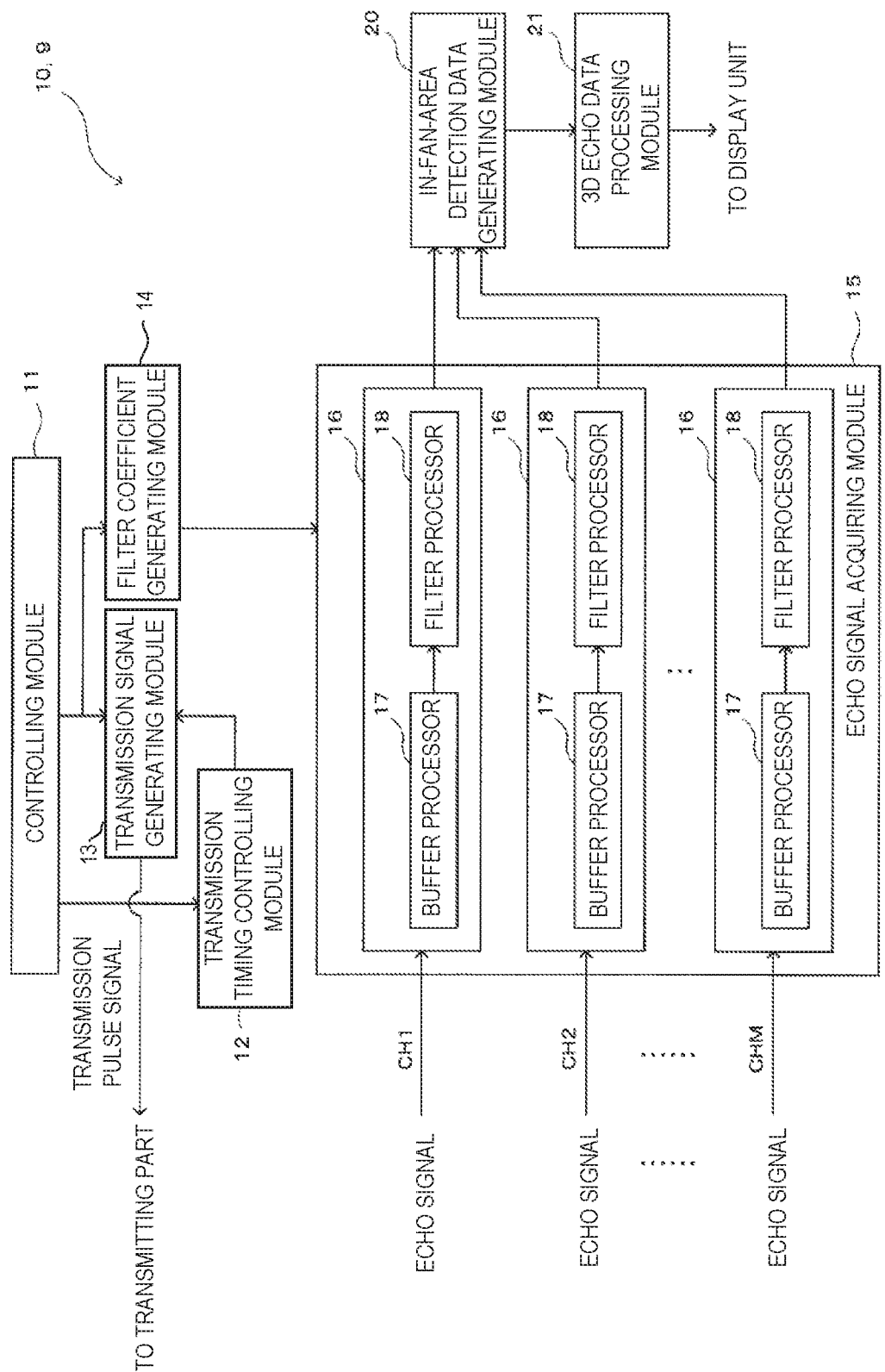
FIG. 6 is a block diagram illustrating a configuration of a signal processor illustrated in FIG. 1.

FIG. 6 is a block diagram illustrating a configuration of the signal processor 10. As illustrated in FIG. 6, the signal processor 10 may include a controlling module 11, a transmission timing controlling module 12, a transmission signal generating module 13, a filter coefficient generating module 14, an echo signal acquiring module 15, an in-fan-area detection data generating module 20 as an image data generating module, and a 3D echo data processing module 21 as a synthesized image data generating module. The signal processor 10 may be comprised of devices, such as a hardware processor 9 (which may also be referred to as processing circuitry) (for example, a CPU, a FPGA, etc.) and a nonvolatile memory. For example, by the CPU reading a program from the nonvolatile memory and executing the program, the signal processor 10 may function as the controlling module 11, the transmission timing controlling module 12, the transmission signal generating module 13, the filter coefficient generating module 14, the echo signal acquiring module 15, the in-fan-area detection data generating module 20, and the 3D echo data processing module 21.

The controlling module 11 may output various information to the transmission timing controlling module 12, the transmission signal generating module 13, and the filter coefficient generating module 14.

Figure 7:
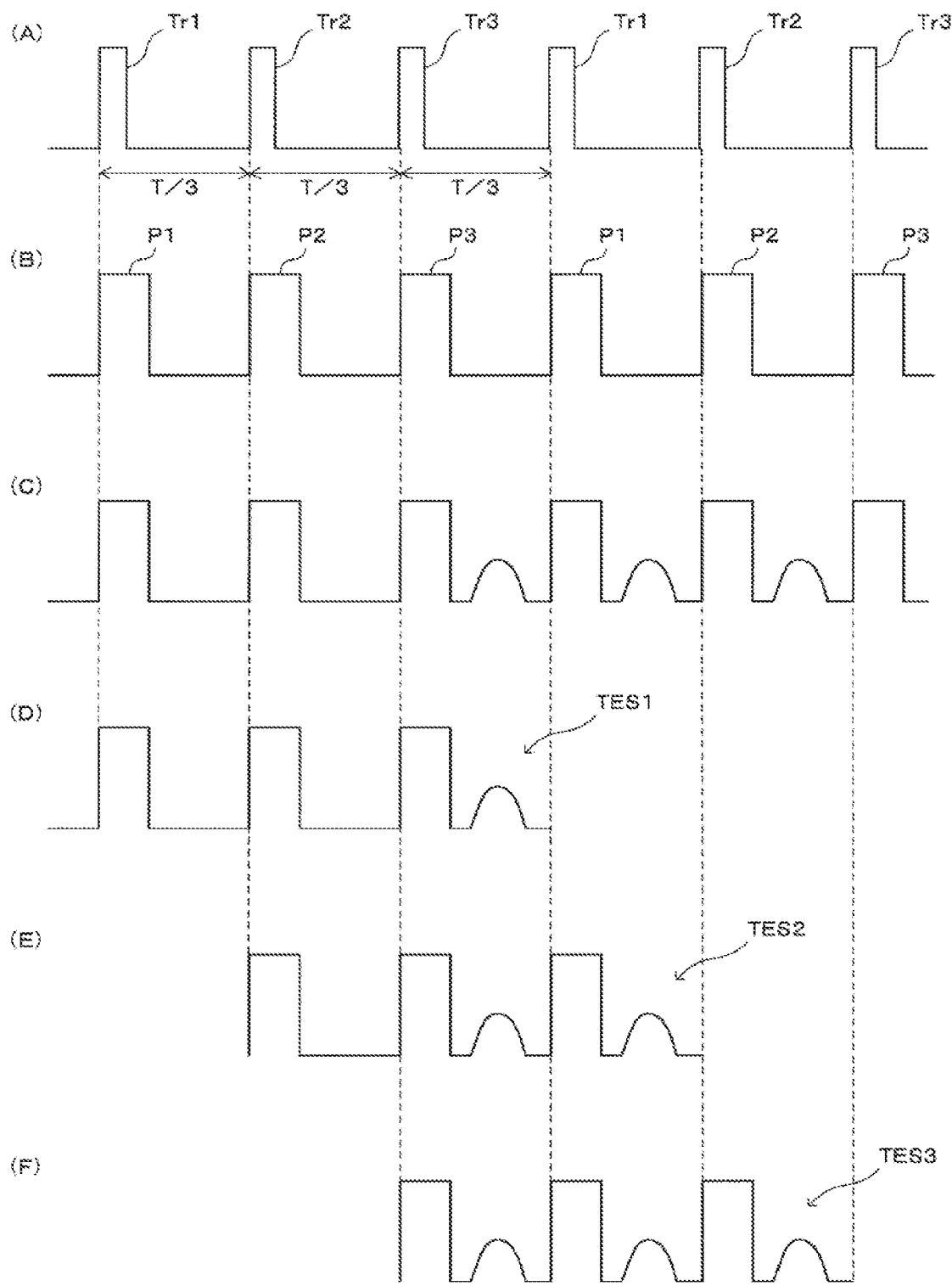
FIG. 7(A) is a time chart of a transmission trigger outputted from a transmission timing controlling module.
FIG. 7(B) is a time chart of the pulse wave transmitted from the transmitter.
FIG. 7(C) is a time chart of an echo signal inputted into each buffer processor.
FIGS. 7(D) to 7(F) are time charts of extracted echo signals outputted from the buffer processors to filter processors.

FIG. 7(A) is a time chart of the transmission trigger outputted from the transmission timing controlling module 12, FIG. 7(B) is a time chart of the transmission pulse wave transmitted from the transmitter, FIG. 7(C) is a time chart of the echo signal inputted into each buffer processor 17, and FIGS. 7(D) to 7(F) are time charts of extracted echo signals outputted from the buffer processor 17 to a filter processor 18, respectively.

The controlling module 11 may notify the transmission timing controlling module 12, of timings at which the transmission timing controlling module 12 is to output the first to third transmission triggers Tr1-Tr3. The first transmission trigger Tr1 may be a trigger for causing the transmission signal generating module 13 to generate the first transmission pulse signal used as the basis of the first transmission pulse wave P1. Moreover, the second transmission trigger Tr2 may be a trigger for causing the transmission signal generating module 13 to generate the second transmission pulse signal used as the basis of the second transmission pulse wave P2. Moreover, the third transmission trigger Tr3 may be a trigger for causing the transmission signal generating module 13 to generate the third transmission pulse signal used as the basis of the third transmission pulse wave P3. For example, referring to FIG. 7(A), a time interval between the first transmission trigger Tr1 and the second transmission trigger Tr2 outputted next to the first transmission trigger Tr1 may be T/3, a time interval between the second transmission trigger Tr2 and the third transmission trigger Tr3 outputted next to the second transmission trigger Tr2 may be T/3, and a time interval between the third transmission trigger Tr3 and the first transmission trigger Tr1 outputted next to the third transmission trigger Tr3 may be T/3.

Moreover, the controlling module 11 may output information on the frequency band of the first to third transmission pulse signals to be generated by the transmission signal generating module 13 to the transmission signal generating module 13 and the filter coefficient generating module 14. The controlling module 11 may output a first frequency band f1, a second frequency band f2, and a third frequency band f3 which are three different frequency bands to the transmission signal generating module 13 and the filter coefficient generating module 14, as the frequency bands of the first transmission pulse signal, the second transmission pulse signal, and the third transmission pulse signal, respectively.

Moreover, the controlling module 11 may output to the filter coefficient generating module 14 filter specifications for generating a filter coefficient to be used for the filtering performed by the filter processor described later in detail (for example, a center frequency of a pass band, a bandwidth of the pass band, a reduction level of a rejecting band, a filter length, etc.).

Referring to FIG. 7(A), the transmission timing controlling module 12 may generate the first to third transmission triggers Tr1-Tr3 at the timings instructed by the controlling module 11, and then sequentially output these transmission triggers to the transmission signal generating module 13 and the echo signal acquiring module 15.

The transmission signal generating module 13 may generate the first transmission pulse signal, the second transmission pulse signal, and the third transmission pulse signal. The first transmission pulse signal may be a transmission pulse signal at a frequency included in the first frequency band f1. The second transmission pulse signal may be a transmission pulse signal at a frequency included in the second frequency band f2. The third transmission pulse signal may be a transmission pulse signal at a frequency included in the third frequency band f3. The frequencies of the transmission pulse signals may be set as frequency bands where they are not overlapped with each other as much as possible within a frequency band range in which the ultrasonic transducers of the transmitter 2 can transmit the ultrasonic wave.

Then, each time the transmission signal generating module 13 receives one of the transmission triggers Tr1-Tr3, it may generate the first transmission pulse signal, the second transmission pulse signal, and the third transmission pulse signal in this order. Thus, the first to third transmission pulse signals may be generated so that the mutual time interval becomes T/3. Note that each transmission pulse signal generated by the transmission signal generating module 13 may be multiplied by a given window function (for example, Gaussian window, Hamming window), and then outputted to the transmitting part 6. The first to third transmission pulse signals outputted to the transmitting part 6 may be amplified by the transmitting part 6, and then transmitted from the transmitter 2 as the first to third transmission pulse waves P1-P3 (refer to FIG. 7(B)), respectively. That is, from the transmitter 2, the first transmission pulse wave P1, the second transmission pulse wave P2, and the third transmission pulse waves P3 may repeatedly be transmitted at the time interval of T/3. Note that, in FIG. 7(B), the pulse signal by which the window function is not multiplied is illustrated.

Moreover, the transmission signal generating module 13 may continuously generate, with a mutual interval therebetween, a sequence comprised of the first transmission pulse signal, the second transmission pulse signal, and the third transmission pulse signal which continue in time. In the relation between two adjacent sequences in time, the first transmission pulse signal included in the sequence generated first may be the first pulse signal, and the second transmission pulse signal included in the sequence generated first may be the second pulse signal. Moreover, in the relation between the two adjacent sequences in time, the first transmission pulse signal included in the sequence generated thereafter may be the third pulse signal, and the second transmission pulse signal included in the sequence generated thereafter may be the fourth pulse signal. That is, the transmission signal generating module 13 may generate, in the two sequences which continue in time, the first pulse signal and the second pulse signal included in the first sequence, and the third pulse signal and the fourth pulse signal included in the next sequence.

The filter coefficient generating module 14 may generate filter coefficients for extracting the first to third echo signals obtained from the reflection waves of the first to third transmission pulse waves P1-P3, based on the information on the first to third frequency bands notified from the controlling module 11, and the filter specification. In detail, the filter coefficient generating module 14 may generate a first filter coefficient α1 for extracting the first echo signal, a second filter coefficient α2 for extracting the second echo signal, and a third filter coefficient α3 for extracting the third echo signal. The filter coefficients α1-α3 generated by the filter coefficient generating module 14 may be notified to the echo signal acquiring module 15. Note that the filter coefficient generating module 14 may also be configured as follows. In detail, from a plurality of filter coefficients which are generated based on a plurality of predefined filter specifications and stored in the memory, the filter coefficient generating module 14 may be configured to select a filter coefficient based on the number for selecting the filter specification notified from the controlling module 11, and then notify the selected filter coefficient to the echo signal acquiring module 15.

Referring to FIGS. 7(C) to 7(F), and FIG. 8, the echo signal acquiring module 15 may acquire, from the echo signals outputted from the receiver 3 side, echo signals of the frequency bands corresponding to the respective frequency bands, in detail, a first echo signal ES1, a second echo signal ES2, and a third echo signal ES3. The echo signal acquiring module 15 may have the same number of echo signal extraction modules 16 as the number of ultrasonic transducers 3a provided to the receiver 3. The echo signal extraction modules 16 may be provided corresponding to the respective ultrasonic transducers 3a.

Each echo signal extraction module 16 may have the buffer processor 17 and the filter processor 18. The processings performed by the echo signal extraction modules 16 may be the same except for that the ultrasonic transducers 3a which output the echo signals are different, and the echo signals outputted through channels CHm (here, m=1, 2, . . . , M) from the ultrasonic transducers 3a are different.

While the buffer processor 17 stores the echo signals (refer to FIG. 7(C)) sent through the corresponding channels CHm, it may output the echo signals after receiving the transmission trigger of the same kind until it again receives the transmission trigger of the same kind to the filter processor 18 as the extracted echo signals. In detail, the buffer processor 17 may output first extracted echo signals TES1 (refer to FIG. 7(D)) which are echo signals after receiving the first transmission trigger Tr1 until it next receives the first transmission trigger Tr1 to the filter processor 18. Moreover, the buffer processor 17 may output second extracted echo signals TES2 (refer to FIG. 7(E)) which are echo signals after receiving the second transmission trigger Tr2 until it next receives the second transmission trigger Tr2 to the filter processor 18. Moreover, the buffer processor 17 may output third extracted echo signals TES3 (refer to FIG. 7(F)) which are echo signals after receiving the third transmission trigger Tr3 until it next receives the third transmission trigger Tr3 to the filter processor 18. Thus, the buffer processor 17 may output to the filter processor 18 the sequentially extracted echo signals TES1, TES2, and TES3 each time one of the first to third signals is extracted.

Figure 8:
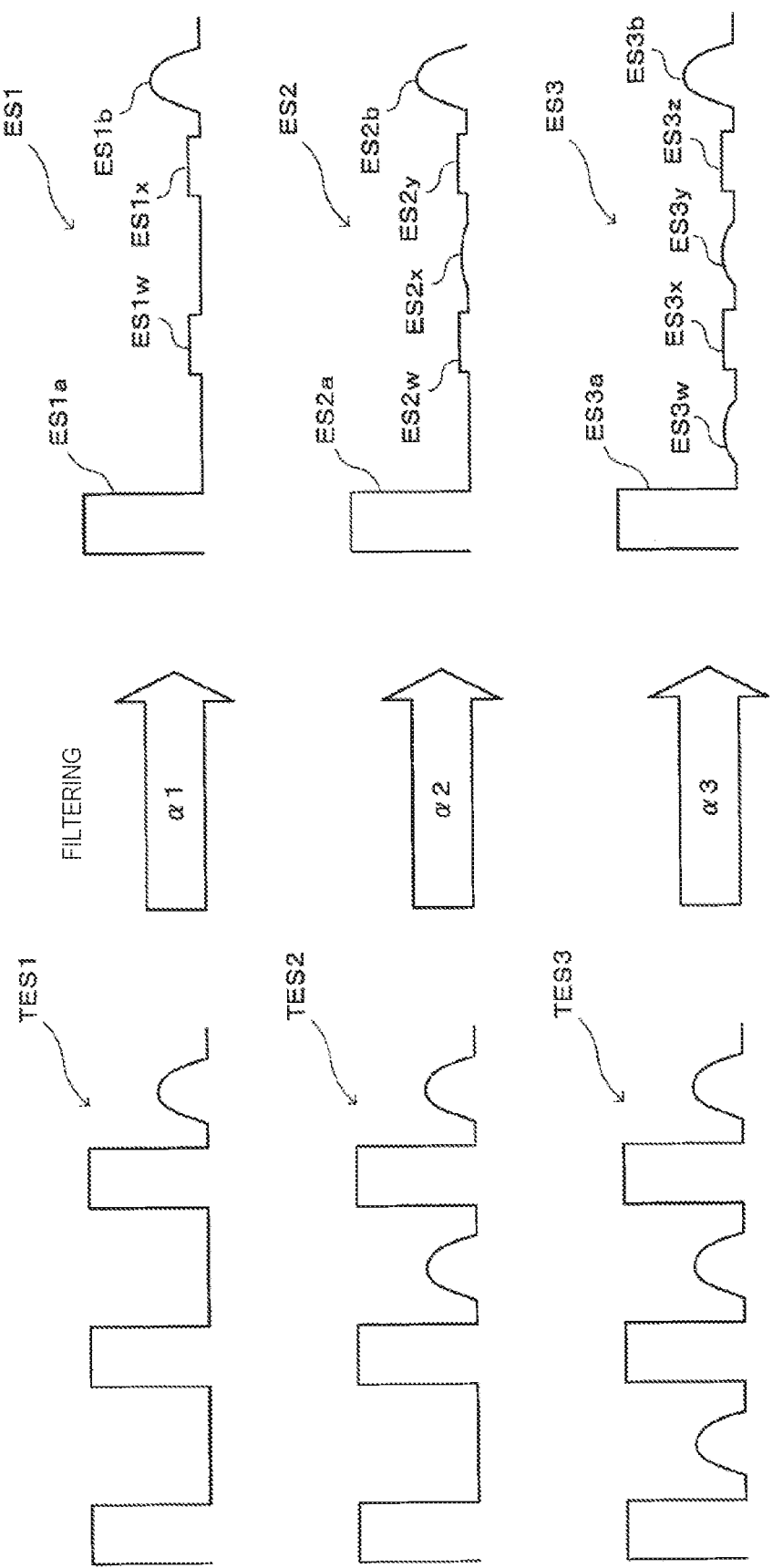
FIG. 8 is a view schematically illustrating the echo signals before and after filtering is performed by the filter processors.

FIG. 8 is a view schematically illustrating the echo signals before and after the filtering is performed by the filter processor 18.

The filter processor 18 may extract the first to third echo signals using the respective filter coefficients α1, α2, and α3 generated by the filter coefficient generating module 14. In detail, referring to FIG. 8, the filter processor 18 may extract the first echo signals ES1 by filtering the first extracted echo signals TES1 using the first filter coefficient α1. Moreover, the filter processor 18 may extract the second echo signals ES2 by filtering the second extracted echo signals TES2 using the second filter coefficient α2. Moreover, the filter processor 18 may extract the third echo signals ES3 by filtering the third extracted echo signals TES3 using the third filter coefficient α3. Thus, the filter processor 18 may serve as a band pass filter. However, the filter processor 18 may have another configuration which acts similarly, instead of the band pass filter itself. For example, the filter processor 18 may be comprised of a combination of a mixer and a low pass filter which convert the signal into a signal at a frequency near direct current.

The first echo signal ES1 may include self-frequency echo signals ES1a and ES1b resulting from the first transmission pulse wave P1 transmitted in order to obtain the first echo signal ES1, and other-frequency echo signals ES1w and ES1x resulting from the transmission pulse waves P2 and P3 of other frequency bands. Since the self-frequency echo signals ES1a and ES1b are almost not influenced by the first filter coefficient α1, its amplitude may be generally the same before and after the filtering. On the other hand, the amplitudes of the other-frequency echo signals ES1w and ES1x may reduce greatly by the filtering with the first filter coefficient α1.

The second echo signal ES2 may include self-frequency echo signals ES2a and ES2b resulting from the second transmission pulse wave P2 transmitted in order to obtain the second echo signal ES2, and other-frequency echo signals ES2w, ES2x, and ES2y resulting from the transmission pulse waves P1 and P3 of other frequency bands. Since the self-frequency echo signals ES2a and ES2b are almost not influenced by the second filter coefficient α2, its amplitude may be generally the same before and after the filtering. On the other hand, the amplitudes of the other-frequency echo signals ES2w, ES2x, and ES2y may reduce greatly by the filtering with the second filter coefficient α2.

The third echo signal ES3 may include self-frequency echo signals ES3a and ES3b resulting from the third transmission pulse wave P3 transmitted in order to obtain the third echo signal ES3, and other-frequency echo signals ES3w, ES3x, ES3y, and ES3z resulting from the transmission pulse waves P1 and P2 of other frequency bands. Since the self-frequency echo signals ES3a and ES3b are mostly not influenced by the third filter coefficient α3, its amplitude may be generally the same before and after the filtering. On the other hand, the amplitudes of the other-frequency echo signals ES3w, ES3x, ES3y, and ES3z may reduce greatly by the filtering with the third filter coefficient α3.

The in-fan-area detection data generating module 20 may perform the beamforming processing based on M echo signals acquired from the echo signal extraction modules 16. As one example of the beamforming techniques, a case where phase regulating addition is carried out is described. By adding, after applying a given phase rotation to each echo signal, the reception beam RB which is directed in the given direction within the range of the angle θ2 (refer to FIG. 5) can be formed. By changing a phase rotation amount applied to each echo data and changing the oriented direction of the reception beam RB within the range of θ2 (i.e., scanning electronically), an echo intensity at each angle θ can be obtained. The in-fan-area detection data generating module 20 can calculate the echo intensity at each position in the area specified by a distance r and the angle θ with reference to the ship by obtaining the echo intensity at each angle θ, for each distance r. Note that, in the following, the echo intensity may also be referred to as the "in-fan-area echo intensity."

Then, the in-fan-area detection data generating module 20 may generate, at least, first image data which is the in-fan-area echo intensity (may be referred to as the "image data") when the angular position of the fan area FA is the first angular position $\varphi_1$, and second image data which is the in-fan-area echo intensity when the angular position of the fan area FA is the second angular position $\varphi_2$. In detail, the in-fan-area detection data generating module 20 may calculate the in-fan-area echo intensity at each of the plurality of angular positions ($\varphi=\varphi_1$, $\varphi_2$, . . . in FIG. 5) of the fan area FA rotated by the motor 4a, and generate a plurality of image data based on the in-fan-area echo intensities.

Figure 9:
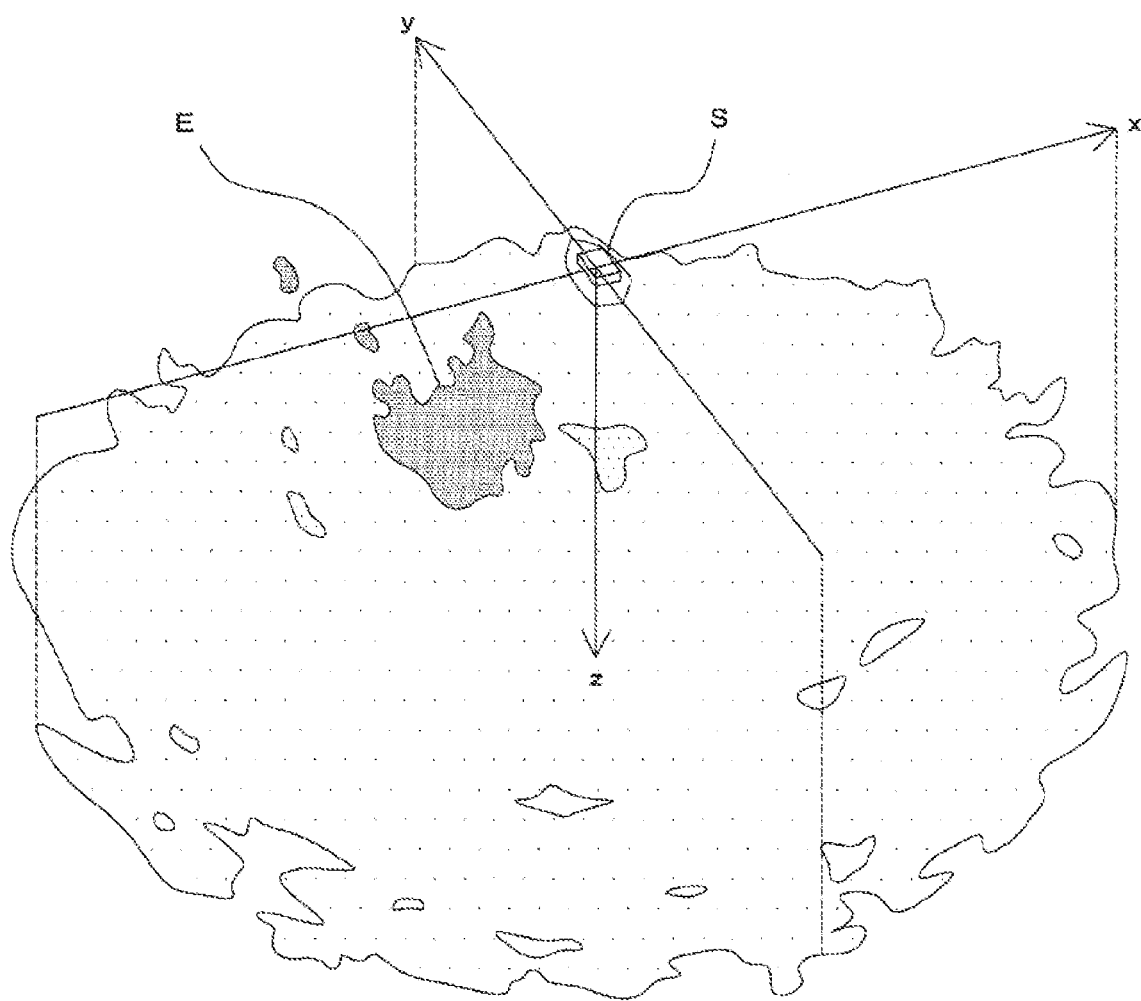
FIG. 9 is a view illustrating one example of an image displayed on a display unit.

The 3D echo data processing module 21 may synthesize the image data at every angular position $\varphi$ ($\varphi_1$, $\varphi_2$, . . . ) which is generated by the in-fan-area detection data generating module 20 to generate synthesized image data. FIG. 9 illustrates an image generated based on the synthesized image data, and is a view illustrating one example of the image displayed on the display unit 8. In FIG. 9, an echo from a shallow position is indicated by dense hatching, and an echo from a deep position is indicated by thin hatching. In the example illustrated in FIG. 9, a comparatively large echo image E considered to be originated in a school of fish at a comparatively shallow position of the port side of the ship S can be confirmed.

Note that, in the image illustrated in FIG. 9, an area where the echo intensity is above a certain threshold is hatched, and therefore, the echo intensity does not correspond to the density of hatching. Moreover, in FIG. 9, although x-axis, y-axis and z-axis corresponding to the x-axis, the y-axis, and the z axis illustrated in FIGS. 2 and 5 are illustrated, the indication of each axis in the display screen displayed on the actual display unit 8 may be arbitrary.

[Effects]

As described above, in the underwater detection device 1 according to this embodiment, the echo intensity within the fan area FA can be calculated by performing the beamforming based on the echo signals ES1, ES2, and ES3 generated based on the reception waves respectively received by the plurality of ultrasonic transducers 3a. Thus, since it becomes unnecessary to mechanically move the receiver 3 in order to obtain the echo intensity within the fan area FA, the echo intensity within the 2D area can be obtained comparatively in a short period of time.

Moreover, in the underwater detection device 1, the position of the fan area FA formed by the receiver 3 may be changed by the motor 4a rotating the receiver 3. Thus, the 3D space can be detected based on the echo intensity within the fan beam area calculated at every angular position φ, and the 3D position of the target object can be estimated. Further, since it becomes unnecessary to arrange the wave receiving elements two-dimensionally or three-dimensionally like the conventionally-known scanning sonar, and the required number of wave receiving elements can be reduced, the device can be simplified.

Moreover, in the underwater detection device 1, after the first transmission pulse wave P1 is transmitted, the second transmission pulse wave P2 in a frequency band different from that of the first transmission pulse wave P1 may be transmitted at the time interval shorter than the time T required for the ultrasonic wave to go and come back in the detection range R. Thus, since the subsequent transmission pulse wave can be transmitted at a shorter time interval, the echo signal from the next angular direction can be acquired in a short period of time. In addition, since the frequency band of the first transmission pulse wave is different from the frequency band of the second transmission pulse wave, it may become possible by using, for example, the filter etc., to extract the echo signal from the desired azimuth out of the echo signals having a plurality of mixed frequency bands.

Therefore, according to the underwater detection device 1, the ultrasonic detecting device which can detect the 3D position of the target object at low cost and in a comparatively short period of time, can be provided.

Moreover, according to the underwater detection device 1, the overall shape of the wave receiving surfaces 3b of the plurality of ultrasonic transducers 3a may be formed in the rectangular shape. Thus, it may become possible to scan in the fan area FA appropriately by the reception beam RB.

Moreover, according to the underwater detection device 1, the motor 4a may rotate the receiver 3 in the direction perpendicular to the fan area FA (in other words, the plane in which the beamforming is performed). Thus, the underwater 3D range can be detected appropriately.

[Modification of First Embodiment]

As described above, although the embodiment of the present disclosure is described, the present disclosure is not limited to the embodiment, and various changes are possible for the present disclosure without departing from the spirit of the present disclosure.

Figure 10:
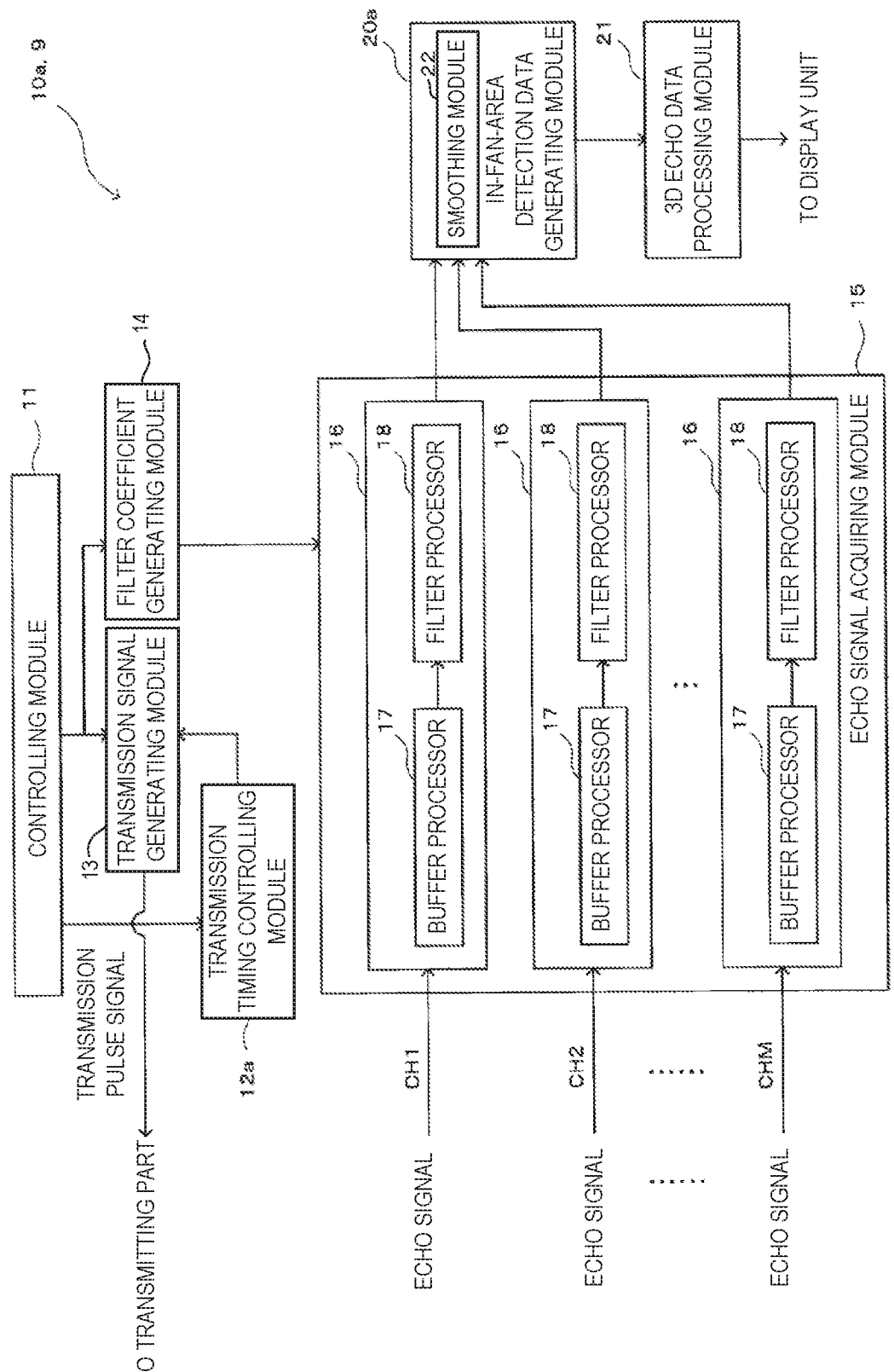
FIG. 10 is a block diagram illustrating a configuration of a signal processor of the underwater detection device according to a modification.

(1) FIG. 10 is a block diagram illustrating a configuration of a signal processor 10a of the underwater detection device according to a modification.

In the embodiment described above, as described with reference to FIG. 8, even if the filter processor 18 tries to extract only the echo signals (for example, the self-frequency echo signals ES1a and ES1b) of the desired frequency band, some echo signals of other frequency bands (for example, the other-frequency echo signals ES1w and ES1x; hereinafter the echo signals are referred to as the "false image factor signals") remain, and therefore, a false image may be caused in the echo image by the false image factor signal. Regarding this situation, in this modification, the false image which may appear on the display unit 8 can be reduced by performing a randomizing of the transmission cycle of the transmission pulse and a smoothing of the in-fan-area echo intensities, which will be described later in detail.

[Randomizing of Transmission Cycle of Transmission Pulse]

Figure 11:
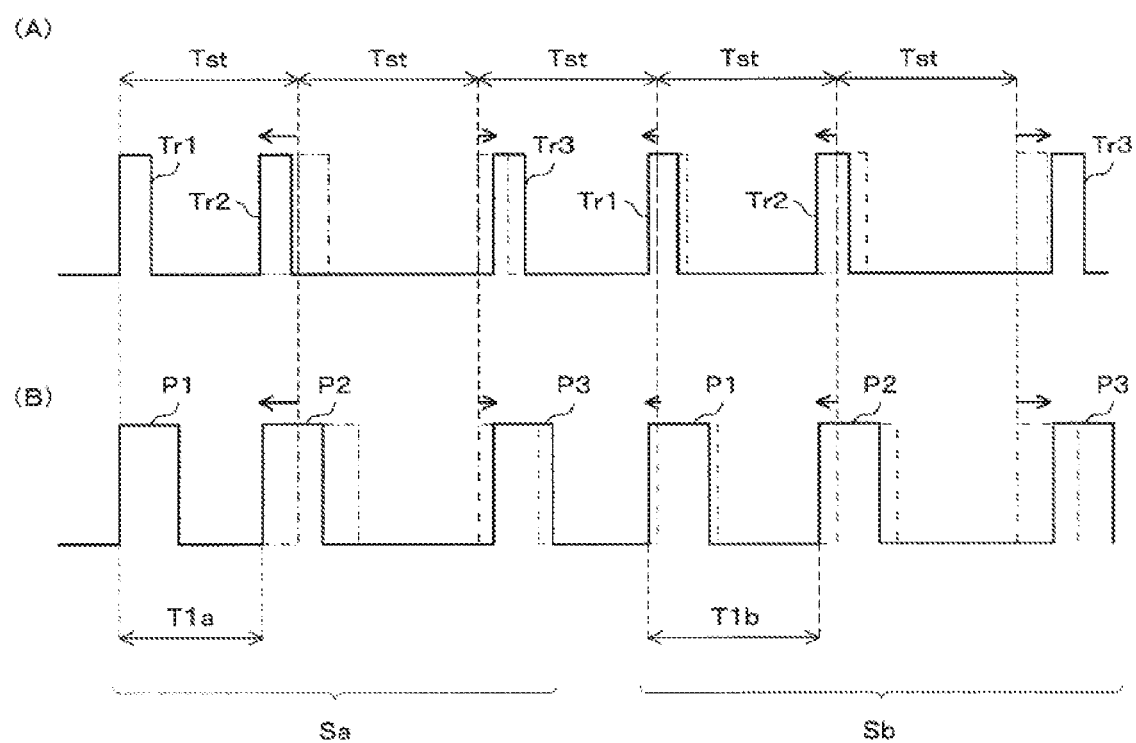
FIG. 11(A) is a time chart of the transmission trigger outputted from the transmission timing controlling module of the signal processor illustrated in FIG. 10.
FIG. 11(B) is a time chart of the pulse wave transmitted from the transmitter in response to the transmission trigger illustrated in FIG. 11(A).

Referring to FIG. 11, a transmission timing controlling module 12a of this modification may output each of the transmission triggers Tr1-Tr3 at a random timing which falls, for example, within a range of ±20% of a reference cycle Tst which is the same time interval as the time intervals T1-T3 (=T/3) of the above embodiment. Thus, in connection with this, the cycle of each of the transmission pulse waves P1-P3 may also be randomized. Therefore, referring to FIG. 11, in the relation between the two temporally continuous sequences Sa and Sb, a second time interval T1b which is the time interval between the first transmission pulse wave (also referred to as the "third pulse wave") and the second transmission pulse wave (also referred to as the "fourth pulse wave") which are included in the second sequence Sb transmitted later may become different from a first time interval T1a which is the time interval between the first transmission pulse wave P1 and the second transmission pulse wave which are included in the first sequence Sa transmitted first. Thus, although the details will be described below, in each of the in-fan-area echo intensities, it may become possible to change the position at which the false images resulting from the other-frequency echo signals appear for every transmission, i.e., for every angular position of the fan area FA.

[Smoothing of In-Fan-Area Echo Intensities]

As illustrated in FIG. 10, an in-fan-area detection data generating module 20a of the signal processor 10a of this modification may have a smoothing module 22 as a false image reducing module which reduces the false image. In detail, the in-fan-area detection data generating module 20a may first calculate the in-fan-area echo intensities at every angular position (φ=φ$_1$, φ$_2$, . . . in FIG. 5) of the fan area which is rotated by the motor 4a, similar to the above embodiment. Then, the smoothing module 22 may smooth the in-fan-area echo intensities obtained corresponding to adjacent angular positions. In detail, for example, as for the in-fan-area echo intensities obtained corresponding to the adjacent angular positions, the echo intensities at the corresponding distance r and angle θ may be smoothed. The 3D echo data processing module 21 may output to the 3D echo data processing module 21 the in-fan-area echo intensities at every angular position $\varphi_1, \varphi_2, \ldots$ to which the smoothing is performed. The smoothing performed by the smoothing module 22 may include an average, a weighted average, and a minimum value selection. For example, in order to perform the weighted average, the smoothing module 22 may be constituted using a FIR filter or an IIR filter.

Figure 12:
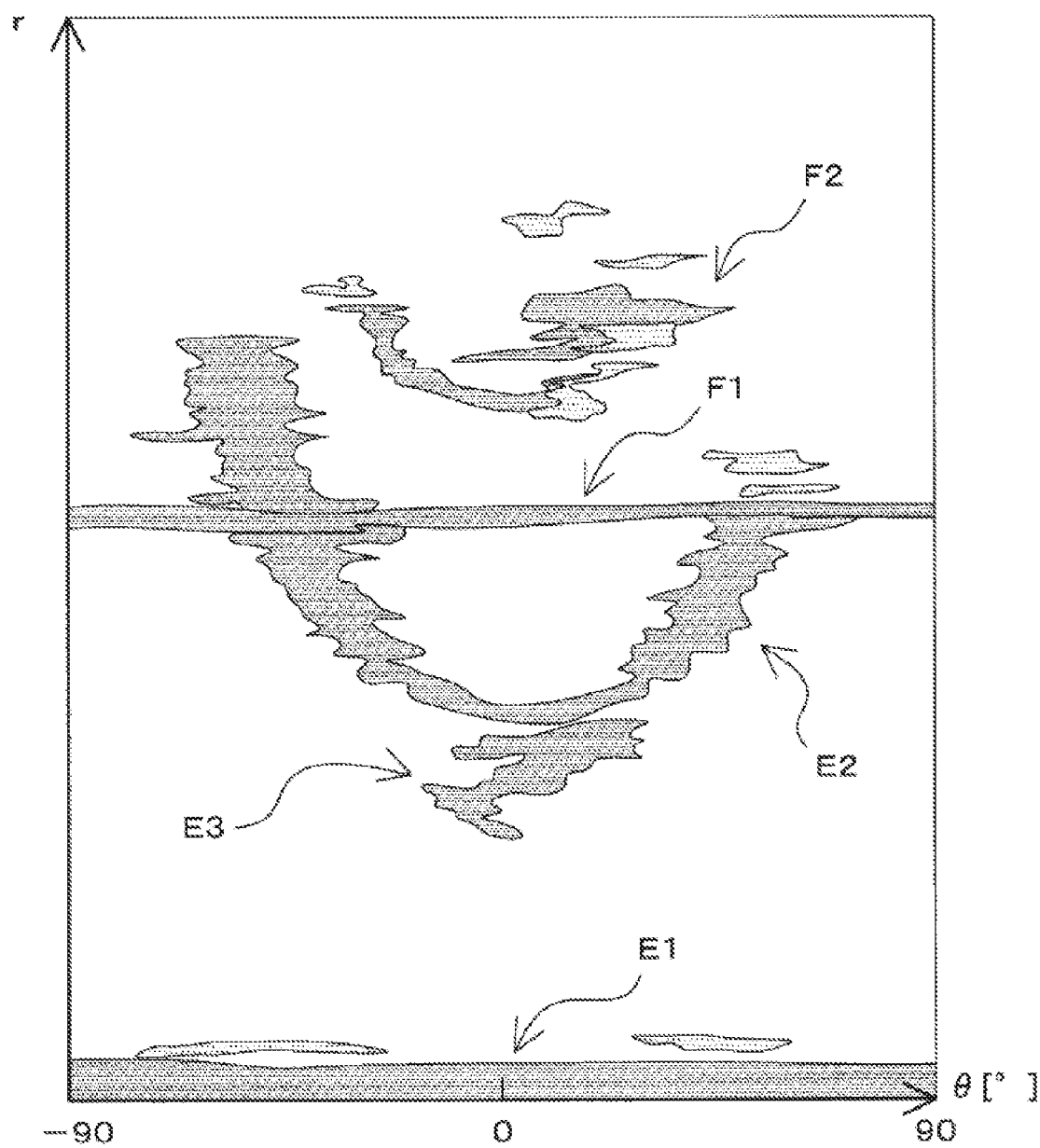
FIG. 12 is a view illustrating one example of in-fan-area echo intensities before performing smoothing.
Figure 13:
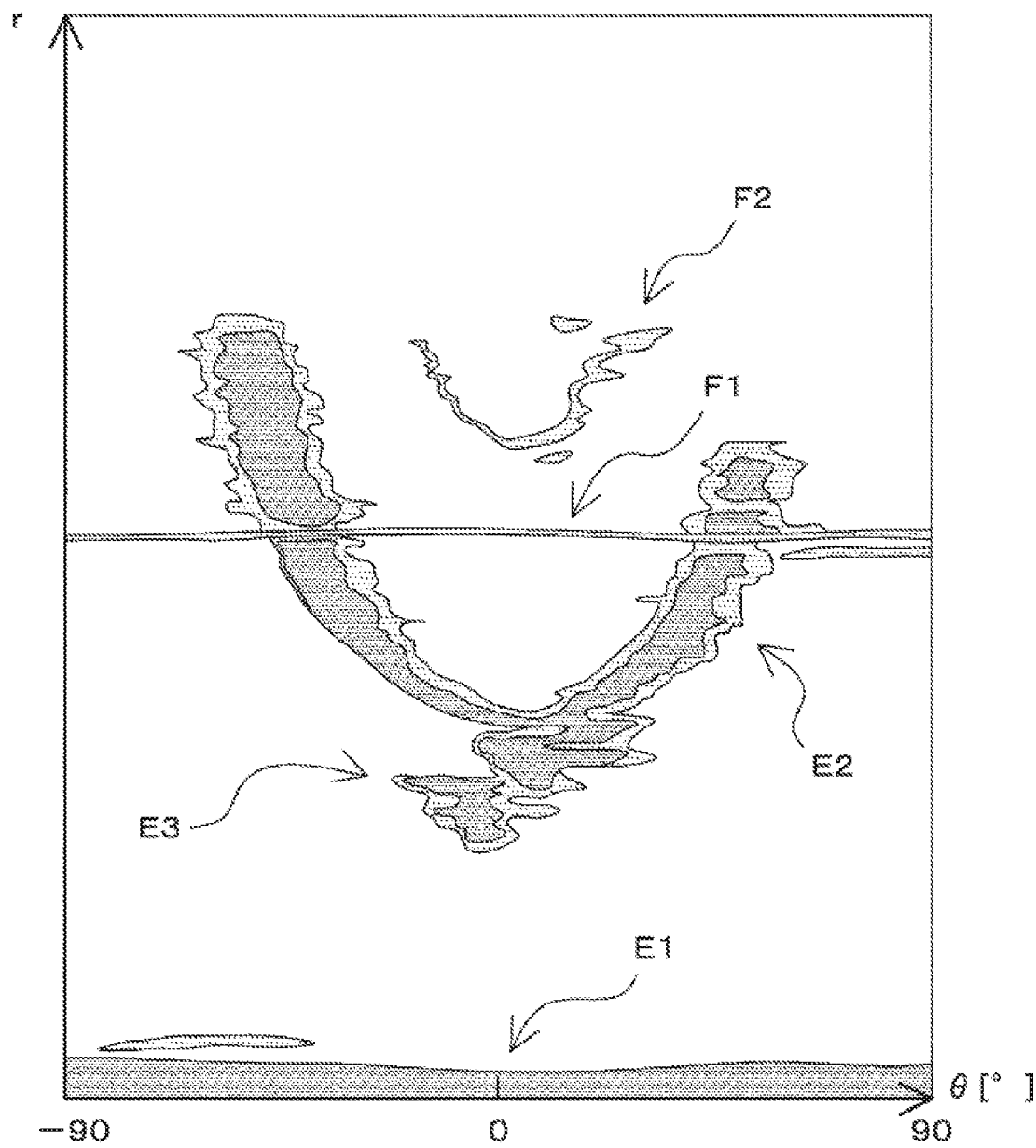
FIG. 13 is a view illustrating one example of the in-fan-area echo intensities after performing the smoothing.

FIG. 12 is a view illustrating one example of the in-fan-area echo intensities before performing the smoothing. Moreover, FIG. 13 is a view illustrating one example of the in-fan-area echo intensities after performing the smoothing.

By performing the randomization of the transmission cycle of the transmission pulse as described above, the false images resulting from the other-frequency echo signals may appear at different positions, in the in-fan-area echo intensities obtained corresponding to the adjacent angular positions. FIG. 12 illustrates a first echo image generated based on the in-fan-area echo intensities before performing the smoothing, i.e., based on image data to which the smoothing is not performed (for example, first image data).

Referring to FIG. 12, the first echo image may include echo images E1, E2, and E3 obtained by the first transmission pulse waves P1 of the first frequency bands, and false images F1 and F2 obtained by the second transmission pulse waves P2 of the second frequency bands. The echo image E1 may be an echo image obtained by the first transmission pulse wave P1 being directly received by the receiver 3, and may be a so-called "emission line." Moreover, the echo image E2 may be an echo image resulting from the seabed. Moreover, the echo image E3 may be an echo image resulting from a school of fish or a fishing reef. Moreover, the false image F1 may be an echo image obtained by the second transmission pulse wave P2 transmitted after a given period of time of the transmission of the first transmission pulse wave being directly received by the receiver 3, and may be a false image resulting from a false image factor signal which is not able to be removed by the filter processor 18. Moreover, the false image F2 may be an echo image resulting from the reception wave obtained from the second transmission pulse wave P2 reflecting on the seabed, and may be a false image resulting from the false image factor signal which is not able to be removed by the filter processor 18. Thus, the false images F1 and F2 resulting from the false image factor signals may appear in the echo image before the smoothing is performed.

Regarding this situation, in the underwater detection device 1 according to this modification, as described above, the first image data and the second image data which are obtained corresponding to the adjacent angular positions (for example, $\varphi_1$ and $\varphi_2$) may be smoothed. In this modification, since the interval of the transmission pulse waves adjacent to each other in time is randomized, the positions of the false images which appear in the respective image data may shift from each other in the r-direction. By smoothing the first image data and the second image data generated in this way, the echo intensities of the false images can be reduced, while maintaining the echo intensities of the desired echo images E1-E3, as illustrated in FIG. 13.

Like this modification as described above, the positions of the false images included in the respective echo images can be mutually shifted in the r-direction by randomizing the timings at which the transmission pulse waves P1-P3 are transmitted within the given range. Thus, it may become possible to reduce the false images included in the synthesized image data by, for example, performing the smoothing described in this modification.

Moreover, in this modification, the false images which may be included in the synthesized image data can be reduced by the smoothing of the smoothing module 22.

Moreover, like this modification, the false images which may be included in the synthesized image data can be appropriately reduced by smoothing the first image data and the second image data which are obtained corresponding to the adjacent angular positions.

Note that, although the example in which the false images are reduced by smoothing the in-fan-area echo intensities obtained at each of the adjacent angular positions is described, the present disclosure is not limited to this configuration. In detail, a plurality of in-fan-area echo intensities at substantially the same angular position obtained by rotating the receiver 3 for a plurality of times may be smoothed. Even with this configuration, the false images which may be included in the synthesized image data can be reduced appropriately. Note that, here, the plurality of in-fan-area echo intensities to be smoothed may be ideally echo intensities acquired at exactly the same angular position. However, since it is actually difficult to acquire the plurality of in-fan-area echo intensities at exactly the same angular position, a certain deviation in the angular position when acquiring the plurality of in-fan-area echo intensities (for example, a deviation of about 6° which is about the same as the thickness of the fan area FA described above) may be permitted.

Moreover, although in this modification the example in which the transmission timings of the transmission pulse waves P1-P3 are randomized is described, the present disclosure is not limited to this configuration. In detail, even if there is the regularity in the transmission timings of the transmission pulse waves P1-P3, it may be desirable that the timings at which the transmission pulse waves P1-P3 are transmitted are not constant.

Moreover, although in this modification the underwater detection device which is capable of performing both the randomizing of the transmission timings of the transmission pulse waves P1-P3 and the smoothing by the smoothing module 22 is described as the example, the present disclosure is not limited to this configuration. In detail, the smoothing module 22 may be omitted in the signal processor 10a according to the modification illustrated in FIG. 10. In this way, although the effect of the false image reduction by the smoothing of the echo intensities cannot be acquired, for example, the false image F1 illustrated in FIG. 12 is not linear but is displayed as a false image having a certain width in the r-direction, so that the false image F1 may be displayed as a whole in a blurred state. As a result, the user may visually recognize that the echo intensities of the false image F1 appear to be reduced.

Figure 14:
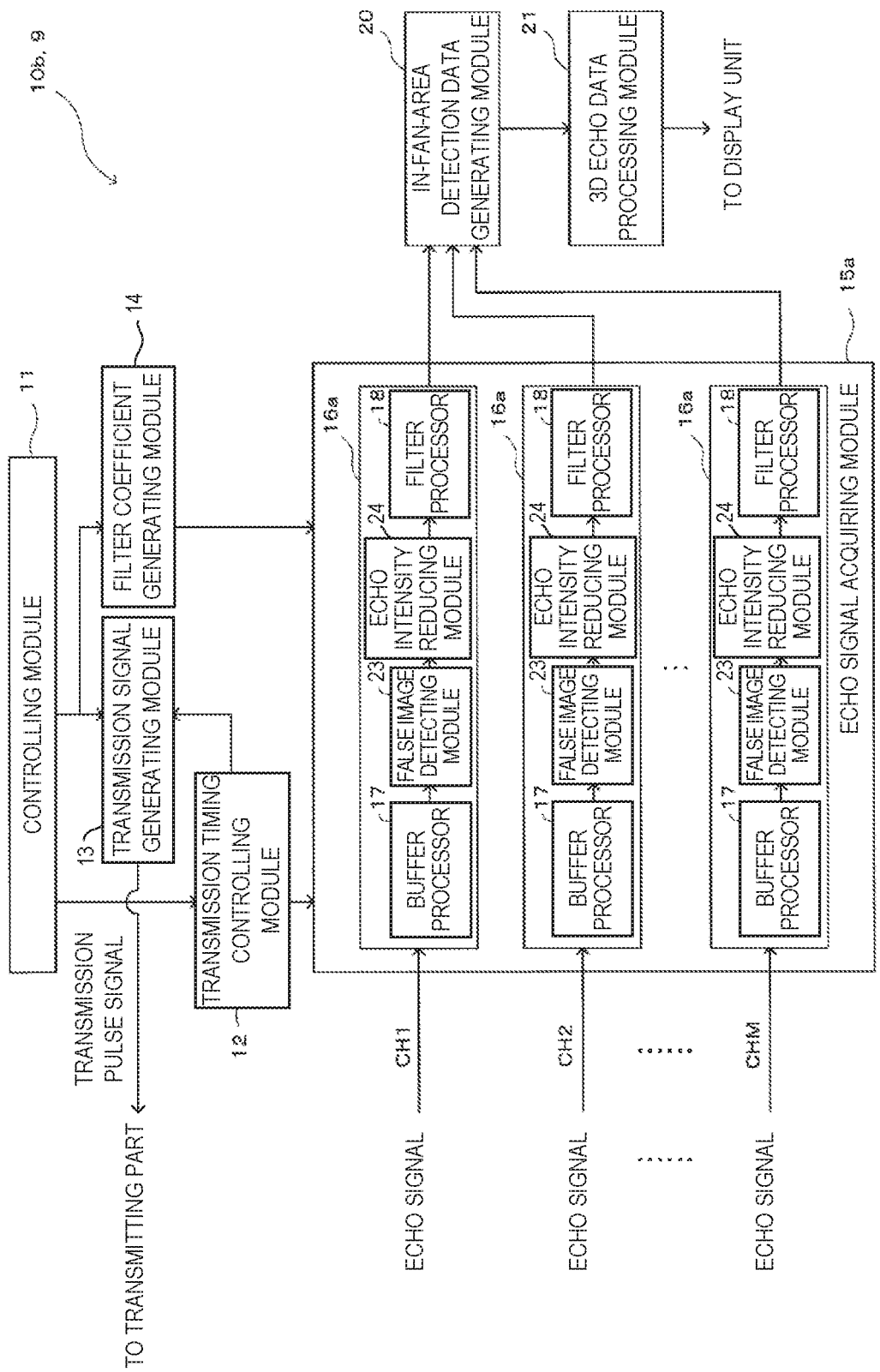
FIG. 14 is a block diagram illustrating a configuration of a signal processor of the underwater detection device according to a modification.
Figure 15:
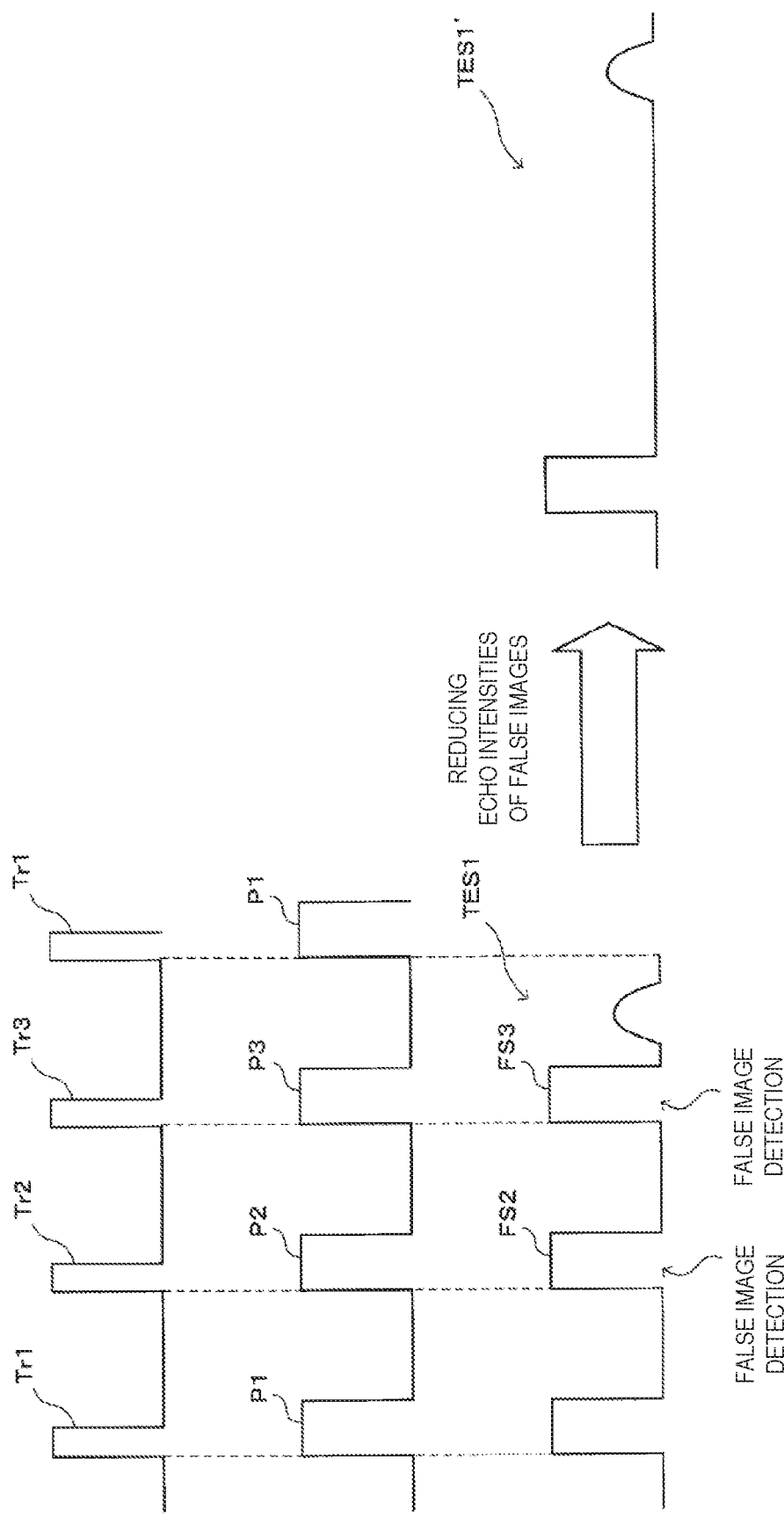
FIG. 15 is a schematic view illustrating a process in which false image factor signals are reduced by an echo signal acquiring module of the signal processor illustrated in FIG. 14.

(2) FIG. 14 is a block diagram illustrating a configuration of a signal processor 10b of the underwater detection device according to a modification. Moreover, FIG. 15 is a schematic view illustrating a process in which the false image factor signal is reduced by an echo signal acquiring module 15a of the signal processor 10b illustrated in FIG. 14.

Although in the modification described above the smoothing module 22 is described as the false image reducing module which reduces the false images, the present disclosure is not limited to this configuration. In detail, each echo signal extraction module 16a of the echo signal acquiring module 15a of this modification may further be provided with a false image detecting module 23 and an echo intensity reducing module 24, in addition to the buffer processor 17 and the filter processor 18.

The false image detecting modules 23 may detect the false image factor signals included in the first to third extracted echo signals TES1, TES2, and TES3 extracted by the buffer processors 17. For example, referring to FIG. 15, if the first extracted echo signal TES1 is described as one example, the false image factor signal included in the first extracted echo signal TES1 may be considered to include an echo signal FS2 obtained at almost the same timing as the timing at which the second transmission pulse wave P2 is transmitted (in other words, the timing at which the second transmission trigger is outputted). This may be because the second transmission pulse wave P2 transmitted from the transmitter 2 is directly received by the receiver 3, with no time interval. Similarly, the false image factor signal included in the first extracted echo signal TES1 may be considered to include an echo signal FS3 obtained at almost the same timing as the timing at which the third transmission pulse wave P3 is transmitted (in other words, the timing at which the third transmission trigger is outputted). This may be because the third transmission pulse wave P3 transmitted from the transmitter 2 is directly received by the receiver 3, with no time interval. The false image detecting module 23 may detect a signal with comparatively large amplitude generated immediately after receiving the second transmission trigger Tr2, and the signal with comparatively large amplitude generated immediately after receiving the third transmission trigger Tr3 as false image factor signals FS2 and FS3.

The echo intensity reducing module 24 may reduce the echo intensities of the false image factor signals FS2 and FS3 detected by the false image detecting module 23. The echo intensity reducing module 24 may output to the filter processor 18 the first extracted echo signal from which the echo intensities of the false image factor signals FS2 and FS3 are reduced in this way, as first echo signal TES1'.

As described above, according to this modification, the false image factor signals resulting from the transmission pulse waves of other frequencies can be reduced. Therefore, it may be possible to make the false images which may appear in the echo images displayed on the display unit 8 inconspicuous.

Note that, in this modification, although the false image detecting module 23 and the echo intensity reducing module 24 as the false image reducing module are provided before the filter processor 18, the present disclosure is not limited to this configuration. In detail, the false image detecting module 23 and the echo intensity reducing module 24 may be provided after the filter processor 18. That is, referring to FIG. 8, the false image factor signals may be detected in the echo signals ES1, ES2, and ES3 after the filtering is performed, and these echo intensities may be reduced. Even in this case, the false images which may appear in the echo images displayed on the display unit 8 can be made inconspicuous.

Alternatively, the false image detecting module 23 and the echo intensity reducing module 24 may be provided in the in-fan-area detection data generating module 20. In this case, the false image detecting module 23 may detect the false image F1 with reference to the transmission timing of each transmission trigger, for example, in each image data as illustrated in FIG. 12. Then, the echo intensity reducing module 24 may reduce the echo intensity of the false image F1 detected by the false image detecting module 23. Even in this case, the false images which may appear in the echo images displayed on the display unit 8 can be made inconspicuous.

Moreover, although in this modification the underwater detection device subject to the randomizing of the transmission timings of the transmission pulse waves P1-P3 is described, it is not limited to this configuration, but may be an underwater detection device which transmits the transmission pulse waves P1-P3 at a given time interval. Even with such an underwater detection device, by the false image detecting module 23 and the echo intensity reducing module 24, the false images which may appear in the echo images displayed on the display unit 8 can be made inconspicuous.

(3) FIGS. 16(A) and 16(B) are schematic views illustrating a transmission beam and a reception beam which are formed by an underwater detection device 1a according to a modification, together with the ship S on which the underwater detection device 1a is mounted, where FIG. 16(A) is a view seen from the side and FIG. 16(B) is a view seen from above. Although the underwater detection device 1 according to the above embodiment is configured to detect below the ship, it is not limited to this configuration, but may be configured to detect forward of the ship, like the underwater detection device 1a according to this modification. That is, the underwater detection device 1a according to this modification may be provided as a forward detection sonar which can detect a reef forward of the ship leading to stranding etc. Below, differences from the above embodiment are mainly described, and other description is omitted. Note that the underwater detection device 1a according to this modification differs greatly in the detectable range, compared with the underwater detection device 1 according to the above embodiment, but the configuration may be about the same as that illustrated in FIG. 1.

The underwater detection device 1a according to this modification may be provided with the transmitter 2 having a similar configuration as the above embodiment. However, in this modification, the transmitter 2 may be fixed to the front side of the ship so that the transmitting surface is inclined forward of the ship with respect to the vertical direction. Thus, in the underwater detection device 1a according to this modification, a volume beam VB as the transmission beam may be formed underwater so as to extend forward of the ship. The shape of the volume beam VB may be formed in, for example, a cone which can cover, when the horizontal direction is set as 0° and the vertically downward direction is set as 90°, a range of 0° to 45° in the up-and-down direction, and can cover a range from 45° starboard side to 45° port side in the left-and-right direction.

Moreover, the underwater detection device 1a according to this modification may be provided with the receiver 3 having a similar configuration to the above embodiment, and the plurality of ultrasonic transducers 3a may be arranged in the left-and-right direction of the ship. However, in this modification, similar to the transmitter 2, the receiver 3 may be arranged forward of the ship so that the wave receiving surface is inclined forward of the ship with respect to the vertical direction. Therefore, in the underwater detection device 1a according to this modification, the fan area FA defined as a range where the plurality of ultrasonic transducers 3a of the receiver 3 have a gain may be formed so as to extend underwater forward of the ship. The shape of the fan area FA in this modification may cover, for example, a range of a comparatively thin two-dimensional shape of which the thickness in the up-and-down direction is about 6°, and from 45° starboard side to 45° port side when the forward is set as 0°. In this modification, by changing the oriented direction of the reception beam RB directed to a given direction in the range from 45° starboard side to 45° port side (i.e., by scanning electronically), the echo intensities within the fan area FA can be obtained.

Moreover, the receiver 3 of this modification may be inclined by the motor 4a upwardly or downwardly so that it reciprocates in the up-and-down direction. In other words, the motor 4a may rotate the receiver 3 along a vertical plane. Thus, since the fan area FA can be reciprocated in the up-and-down direction, the forward of the ship can be detected three-dimensionally.

As described above, even by reciprocating the fan area FA like this modification, similar to the underwater detection device 1 according to the above embodiment, the detection device, which can detect the 3D position of the target object at low cost and in a comparatively short period of time, can be provided.

Moreover, in the underwater detection device of this modification, since the receiver 3 is reciprocated, the detection device which can detect appropriately the detection area which extends in the given direction (for example, forward of the ship) with the comparatively simple configuration can be constituted. Note that, in this modification, the arrangement direction of the plurality of ultrasonic transducers 3a may be a direction along a vertical plane, and the driving or rotating direction of the fan area FA may be a direction perpendicular to the arrangement direction of the plurality of ultrasonic transducers 3a. Thus, by suitably setting the arrangement direction of the plurality of ultrasonic transducers 3a and the driving direction of the fan area FA, it may become possible to detect the range from the sides of the ship, or the range from the front to the sides of the ship.

(4) Although in the above embodiment the transmitter 2 is rotated by the motor 4a, it is not limited to this configuration. In detail, the underwater detection device in which the motor 4a only rotates the receiver 3 and does not rotate the transmitter 2 may be constituted. In this case, the transmitter may be a transmitter capable of forming a transmission beam which spreads underwater toward all the azimuth directions centering on the ship S.

(5) Although in the above embodiment the echo intensity at each angle θ in the fan area FA is calculated by summing phase shifted signals as the beamforming technique of the in-fan-area detection data generating module 20, it is not limited to this configuration. In detail, the echo intensity at each angle θ in the fan area FA may be calculated using an adaptive beamforming method, such as the Capon method and the MUSIC method. Thus, compared with using the summing of phase shifted signals, the angular resolution in the θ direction of the device can be improved.

(6) In the above embodiment, although the receiver 3 is formed in the linear array type, it is not limited to this configuration, and, for example, by arranging the plurality of ultrasonic transducers 3a in a row along an arc, the range of the fan area FA can be expanded in the θ direction, and therefore, a larger area can be detected.

(7) Although in the above embodiment the frequency of each transmission pulse wave is a single frequency, it is not limited to this configuration. In detail, the frequency of each transmission pulse wave may be desirably included in a given frequency band. In detail, for example, each transmission pulse wave may be used as a frequency modulation pulse wave, and an underwater detection device which performs a pulse compression during a process of a reflection wave thereof may be constituted. Thus, the underwater detection device which excels in both the resolution in the distance direction and the Doppler tolerance can be provided.

(8) Although in the above embodiment the transmitter 2 and the receiver 3 are rotated by a sole motor 4a, it is not limited to this configuration. In detail, the transmitter 2 and the receiver 3 may be rotated by separate motors.

Second Embodiment

Hereinafter, an underwater detection device as an ultrasonic detecting device according to a second embodiment of the present disclosure is described with reference to the drawings. An underwater detection device 1A according to this embodiment of the present disclosure may be the underwater detection device of a so-called multi-ping type, similar to the underwater detection device 1 of the first embodiment.

The underwater detection device 1A is, for example, a fish finder, and is mounted on the bottom of the ship S as a ship. This underwater detection device 1A may be mainly used for detecting target objects, such as a fish and a school of fish, within a given underwater detection range below the ship. The underwater detection device 1A may be used for other applications, such as a detection of ups and downs of the seabed, such as a reef, and a structure, such as an artificial fish reef. This underwater detection device 1A may be an ultrasonic detecting device with one channel (single beam), and it can display the target object in a 2D image of which the dimensions are comprised of a dimension of a propagating direction of the ultrasonic wave and a dimension of time, as will be described later in detail. Further, in this second embodiment, the underwater detection device 1A to which the multi-ping technique is applied may prevent a generation of the false image caused by the transmission at the plurality of frequencies by differentiating the transmission timings of the plurality of frequencies.

[Entire Configuration]

Figure 17:
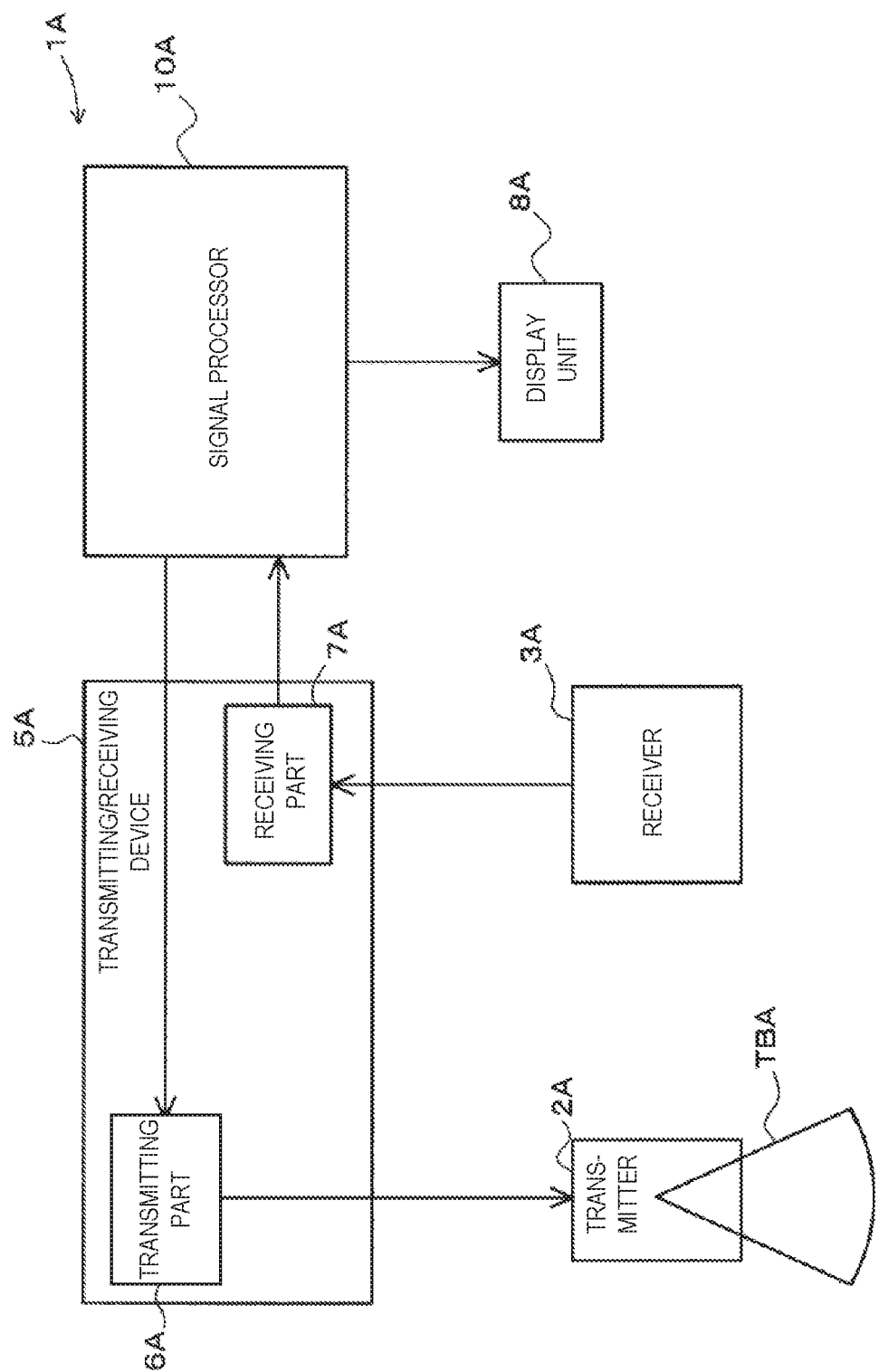
FIG. 17 is a block diagram illustrating a configuration of an underwater detection device according to a second embodiment of the present disclosure.

FIG. 17 is a block diagram illustrating a configuration of the underwater detection device 1A according to the second embodiment of the present disclosure. As illustrated in FIG. 17, the underwater detection device 1A may include a transmitter 2A, a receiver 3A, a transmitting/receiving device 5A, a signal processor 10A, and a display unit 8A.

The transmitter 2A may transmit the pulse-shaped ultrasonic wave underwater, and it may be provided to the ship's bottom so that the transmitting surface from which the ultrasonic wave is transmitted is exposed underwater. The transmitter 2A may have one or more ultrasonic transducers, and may be configured to be formable of a transmission beam TBA of a pulse shape as illustrated in FIG. 17. The transmitter 2A may be provided to the ship's bottom so that a center axis of the transmission beam TBA is oriented in the vertical direction.

The transmission beam TBA may repeatedly be transmitted in connection with a traveling of the ship S moving in a direction D1, and may be sequentially transmitted toward a vertical plane perpendicular to the moving direction D1.

Figure 18:
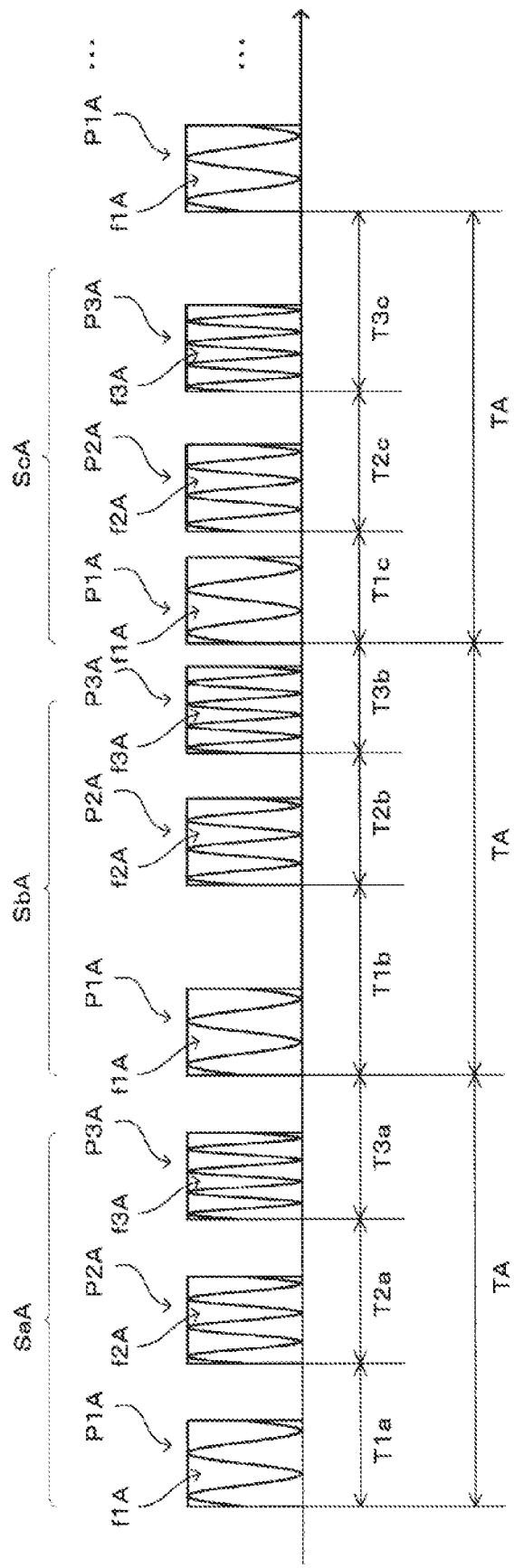
FIG. 18 is a view illustrating a transmission pulse wave transmitted from a transmitter.

FIG. 18 is a view illustrating a transmission pulse wave transmitted from the transmitter 2A. Referring to FIGS. 17 and 18, from the transmitter 2A, a first transmission pulse wave P1A, a second transmission pulse wave P2A, and a third transmission pulse wave P3A which are obtained by converting into ultrasonic waves the first to third amplified transmission pulse signals sequentially outputted from the transmitting part 6A, as will be described later in detail, may be transmitted. The transmission pulse waves P1A, P2A, and P3A may be comprised of pulse waves at different frequency bands. From the transmitter 2A, a sequence including the first transmission pulse wave P1A, the second transmission pulse wave P2A, and the third transmission pulse wave P3A as one set may repeatedly be transmitted at every fixed cycle TA. In FIG. 18, three sequences SaA, SbA, and ScA are illustrated.

In this embodiment, times TA of the three sequences SaA, SbA, and ScA may be the same. On the other hand, time intervals of the transmission pulse waves in one sequence may be different. In detail, in the sequence SaA, the time intervals T1a, T2a, and T3a of the transmission pulse waves may be TA/3. On the other hand, in the sequence SbA, the time interval T1b, T2b, and T3b of the transmission pulse waves may be T1b>T2b>T3b. Moreover, in the sequence ScA, the time intervals T1c, T2c, and T3c of the transmission pulse waves may be T1c<T2c<T3c. In this embodiment, the three sequences SaA, SbA, and ScA may repeatedly be transmitted in this order.

Note that, in this embodiment, although the three sequences SaA, SbA, and ScA are illustrated, the configuration may be altered. For example, two, or four or more sequences are set, and the time intervals of the transmission pulse waves P1A-P3A in each sequence may differ from each other. Alternatively, the time intervals of the transmission pulse waves P1A-P3A in one sequence may be set at random by the signal processor 10A described later. The configuration in which the time intervals of the transmission pulse waves P1A-P3A in one sequence are set at random will be described later as a modification.

Note that, in FIG. 18, the transmission pulse waves P1A-P3A are schematically illustrated. Moreover, although the three transmission pulse waves P1A-P3A at mutually different frequency bands are included in one sequence, the present disclosure is not limited to this configuration. In detail, two, or four or more transmission pulse waves at different frequency bands may be included in one sequence. Also in this case, the time intervals of the transmission pulses may be set differently for every sequence.

Moreover, in the sequences sequentially transmitted from the transmitter 2A, a sequence outputted first among the adjacent sequences in time may be referred to as a first sequence, and a sequence outputted thereafter may be referred to as a second sequence. In detail, in a relation between the sequence SaA and the sequence SbA, SaA may be the first sequence and SbA may be the second sequence. Moreover, in a relation between the sequence SbA and the sequence ScA, SbA may be the first sequence and ScA may be the second sequence.

As described above, each sequence SaA, SbA, and ScA may be transmitted at the same cycle TA. The cycle TA of the sequence may be set as a period of time between a transmission of the ultrasonic wave from the transmitter 2A and a retuning of the ultrasonic wave to the receiver 3A after the ultrasonic wave travels over the detection range R which is the distance within which the target object is detected by the underwater detection device 1A according to this embodiment. In other words, the cycle TA of the sequence may be set as a time required for the ultrasonic wave to go and come back (i.e., make a round trip) in the detection range R. That is, in the underwater detection device 1A according to this embodiment, in the sequences SaA, SbA, and ScA, the time intervals T1a, T1b, T1c, T2a, T2b, T2c, T3a, T3b, and T3c of the transmission pulse waves adjacent to each other in time may be all set as time intervals shorter than the time required for the ultrasonic wave to go and come back underwater in the detection range R (may be referred to as a "first time interval" and a "second time interval").

Note that the transmission pulse wave NA included in the first sequence (for example, the sequence SaA) may be the first pulse wave, and the transmission pulse wave P2A included in the sequence SaA may be the second pulse wave. Moreover, the transmission pulse wave P1A included in the second sequence (for example, the sequence SbA) may be the third pulse wave, and the transmission pulse wave P2A included in the sequence SbA may be the fourth pulse wave. Moreover, the pulse signal used as the basis of the first pulse wave may be the first pulse signal, the pulse signal used as the basis of the second pulse wave may be the second pulse signal, the pulse signal used as the basis of the third pulse wave may be the third pulse signal, and the pulse signal used as the basis of the fourth pulse wave may be the fourth pulse signal, which are described above. In this embodiment, although the frequency band of the first pulse wave and the frequency band of the third pulse wave are set identically, they may be set as different frequency bands without being limited to the configuration. Moreover, in this embodiment, although the frequency band of the second pulse wave and the frequency band of the fourth pulse wave are set identically, they may be set as different frequency bands without being limited to the configuration. Moreover, in the relation between the first sequence (for example, the sequence SaA) and the second sequence (for example, the sequence SbA), the frequency band of the transmission pulse wave P1A included in the first sequence SaA may be the first frequency band, the frequency band of the transmission pulse wave P2A included in the first sequence SaA may be the second frequency band, the frequency band of the transmission pulse wave P1A included in the second sequence SbA may be the third frequency band, and the frequency band of the transmission pulse wave P2A included in the second sequence SbA may be the fourth frequency band.

The receiver 3A may have one ultrasonic transducer. The receiver 3A may be provided separately from the transmitter 2A. The ultrasonic transducer of the receiver 3A may have the wave receiving surface by which the ultrasonic wave is received, and this wave receiving surface may be exposed underwater. The ultrasonic transducer of the receiver 3A may receive the reflection wave of each transmission pulse wave which is the ultrasonic wave transmitted from the transmitter 2A as the reception wave, and convert it into the echo signal as the electrical signal.

The transmitting/receiving device 5A may include a transmitting part 6A and a receiving part 7A.

The transmitting part 6A may amplify the transmission pulse signal generated by the signal processor 10A, and apply the amplified signal to the transmitter 2A as the amplified transmission pulse signal. Thus, from the transmitter 2A, the transmission pulse waves P1A-P3A corresponding to the amplified transmission pulse signals may be transmitted. In detail, from the transmitter 2A, the first transmission pulse wave NA corresponding to the first amplified transmission pulse signal, the second transmission pulse wave P2A corresponding to the second amplified transmission pulse signal, and the third transmission pulse wave P3A corresponding to the third amplified transmission pulse signal may be transmitted with a given time interval therebetween.

The receiving part 7A may amplify the echo signal as the electrical signal outputted from the receiver 3A, and then A/D-convert the amplified echo signal. Then, the receiving part 7A may output the echo signal converted into the digital signal to the signal processor 10A. In more detail, the receiving part 7A may have the reception circuit. This reception circuit may perform a given processing described above to each echo signal acquired by converting the reception wave received by the ultrasonic transducer of the receiver 3A into the electrical signal, and then output each echo signal to the signal processor 10A.

The signal processor 10A may generate the transmission pulse signal as the transmission signal, and input it into the transmitting part 6A. Moreover, the signal processor 10A may process the echo signal outputted from the receiving part 7A, and perform a processing to generate the image data of the target object. The configuration of the signal processor 10A will be described later in detail.

The display unit 8A may display the image according to the image data outputted from the signal processor 10A on the display screen. In this embodiment, the display unit 8A may display the underwater state below the ship as the 2D image of which the dimensions are comprised of the dimension of the propagating direction of the ultrasonic wave and the dimension of time. Thus, the user may look at the display screen and can guess the underwater state below the ship (for example, the existence and the positions of a single fish and a school of fish, ups and downs of the seabed, and the structure such as an artificial fish reef).

[Configuration of Signal Processor]

Figure 19:
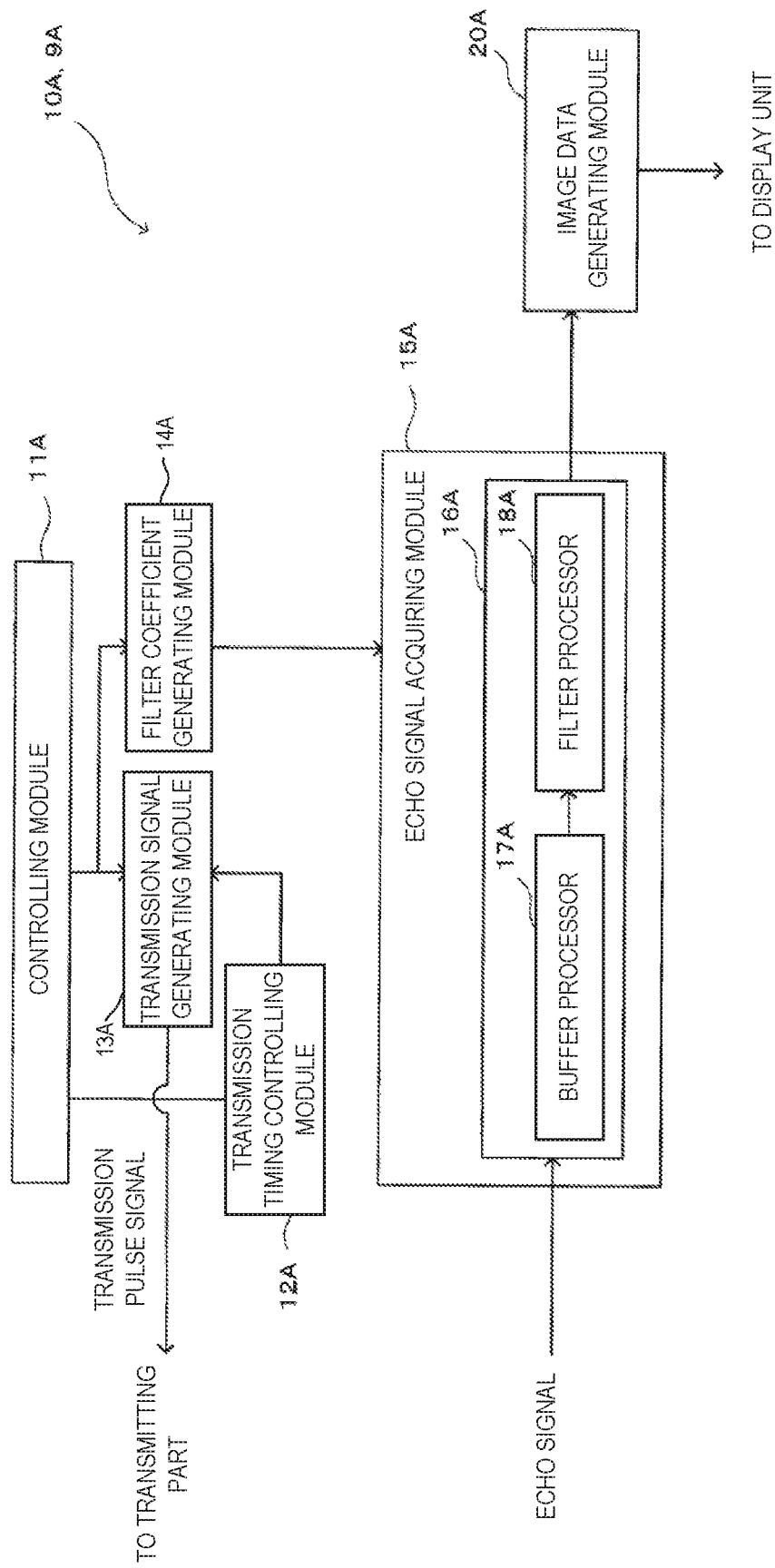
FIG. 19 is a block diagram illustrating a configuration of a signal processor.

FIG. 19 is a block diagram illustrating a configuration of the signal processor 10A. As illustrated in FIG. 19, the signal processor 10A may have a controlling module 11A, a transmission timing controlling module 12A, a transmission signal generating module 13A, a filter coefficient generating module 14A, an echo signal acquiring module 15A, and an image data generating module 20A. The signal processor 10A may be comprised of devices, such as a hardware processor 9A (which may also be referred to as processing circuitry) (for example, a CPU, a FPGA, etc.) and a nonvolatile memory. For example, by the CPU reading a program from the nonvolatile memory and executing the program, the signal processor 10A may function as the controlling module 11A, the transmission timing controlling module 12A, the transmission signal generating module 13A, the filter coefficient generating module 14A, the echo signal acquiring module 15A, and the image data generating module 20A.

The controlling module 11A may output various information to the transmission timing controlling module 12A, the transmission signal generating module 13A, and the filter coefficient generating module 14A.

FIG. 20(A) is a time chart of transmission triggers outputted from the transmission timing controlling module 12A, FIG. 20(B) is a time chart of the transmission pulse waves transmitted from the transmitter, FIG. 20(C) is a time chart of the echo signal inputted into the buffer processor 17A, and FIGS. 20(D) to 20(F) are time charts of extracted echo signals outputted to a filter processor 18A from a buffer processor 17A.

Figure 20:
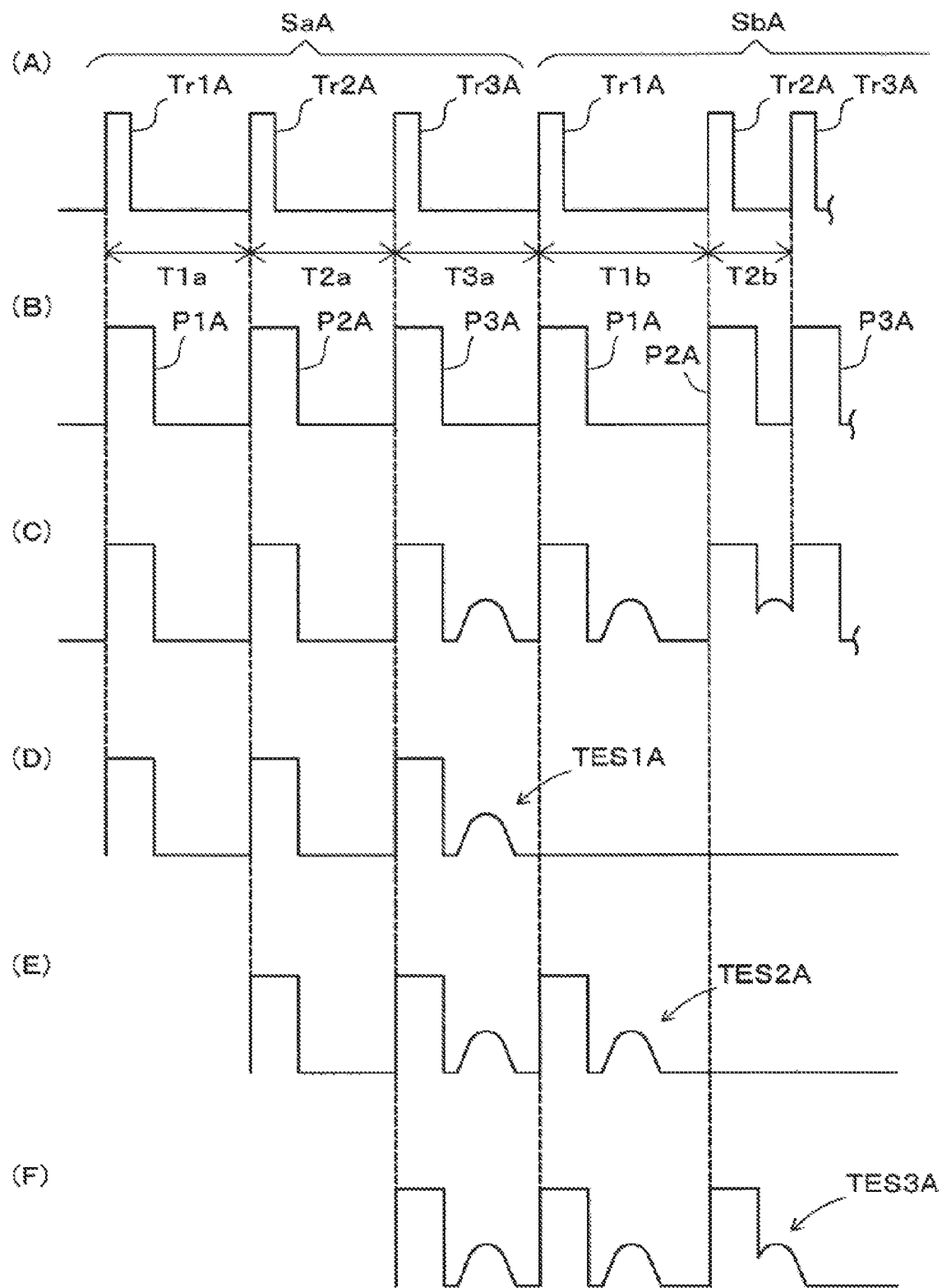
FIG. 20(A) is a time chart of a transmission trigger outputted from a transmission timing controlling module.
FIG. 20(B) is a time chart of the transmission pulse waves transmitted from the transmitter.
FIG. 20(C) is a time chart of an echo signal inputted into a buffer processor.
FIGS. 20(D) to 20(F) are time charts of the extracted echo signals outputted from the buffer processor to a filter processor.

Referring to FIGS. 19 to 20(F), the controlling module 11A may notify the timings at which the transmission timing controlling module 12A is to output first to third transmission triggers Tr1A-Tr3A to the transmission timing controlling module 12A. The first transmission trigger Tr1A may be a trigger for causing the transmission signal generating module 13A to generate the first transmission pulse signal used as the basis of the first transmission pulse wave P1A. Moreover, the second transmission trigger Tr2A may be a trigger for causing the transmission signal generating module 13A to generate the second transmission pulse signal used as the basis of the second transmission pulse wave P2A. Moreover, the third transmission trigger Tr3A may be a trigger for causing the transmission signal generating module 13A to generate the third transmission pulse signal used as the basis of the third transmission pulse wave P3A.

For example, as illustrated in FIG. 20(A), when transmitting the sequence SaA, the time intervals equivalent to the time intervals between the transmission pulse waves P1A-P3A in the sequence SaA are set. That is, the time interval between the first transmission trigger Tr1A and the second transmission trigger Tr2A outputted next to the first transmission trigger Tr1A may be T$1a$, the time interval between the second transmission trigger Tr2A and the third transmission trigger Tr3A outputted next to the second transmission trigger Tr2A may be T$2a$, and the time interval between the third transmission trigger Tr3A and the first transmission trigger Tr1A outputted next to the third transmission trigger Tr3A may be T$3a$.

Similarly, when transmitting the sequence SbA, the time intervals equivalent to the time intervals between the transmission pulse waves in the sequence SbA may be set. That is, the time interval between the first transmission trigger Tr1A and the second transmission trigger Tr2A outputted next to the first transmission trigger Tr1A may be T$1b$, the time interval between the second transmission trigger Tr2A and the third transmission trigger Tr3A outputted next to the second transmission trigger Tr2A may be T$2b$, and the time interval between the third transmission trigger Tr3A and the first transmission trigger Tr1A outputted next to the third transmission trigger Tr3A may be T$3b$.

Similarly, when transmitting the sequence ScA, although not illustrated in FIG. 20(A), the time intervals equivalent to the time intervals between the transmission pulse waves in the sequence ScA may be set. That is, the time interval between the first transmission trigger Tr1A and the second transmission trigger Tr2A outputted next to the first transmission trigger Tr1A may be T$1c$, the time interval between the second transmission trigger Tr2A and the third transmission trigger Tr3A outputted next to the second transmission trigger Tr2A may be T$2c$, and the time interval between the third transmission trigger Tr3A and the first transmission trigger Tr1A outputted next to the third transmission trigger Tr3A may be T$3c$.

Moreover, the controlling module 11A may output information on the frequency bands of the first to third transmission pulse signals to be generated by the transmission signal generating module 13A, to the transmission signal generating module 13A and the filter coefficient generating module 14A. The controlling module 11A may output a first frequency band f1A, a second frequency band f2A, and a third frequency band f3A which are three different frequency bands to the transmission signal generating module 13A and the filter coefficient generating module 14A as the respective frequency bands of the first transmission pulse signal, the second transmission pulse signal, and the third transmission pulse signal.

Moreover, the controlling module 11A may output the filter specification for generating the filter coefficient to be used by the filtering performed by the filter processor described later in detail (for example, the center frequency of the pass band, the bandwidth of the pass band, the reduction level of the rejecting band, the filter length, etc.) to the filter coefficient generating module 14A.

Referring to FIGS. 19 and 20(A), the transmission timing controlling module 12A may generate the first to third transmission triggers Tr1A-Tr3A at the timings instructed by the controlling module 11A, and sequentially output the transmission triggers to the transmission signal generating module 13A and the echo signal acquiring module 15A.

The transmission signal generating module 13A may generate the first transmission pulse signal, the second transmission pulse signal, and the third transmission pulse signal. The first transmission pulse signal may be a transmission pulse signal at a frequency included in first frequency band f1A. The second transmission pulse signal may be a transmission pulse signal at a frequency included in second frequency band f2A. The third transmission pulse signal may be a transmission pulse signal at a frequency included in third frequency band f3A. The frequencies of the transmission pulse signals may be set within frequency bands which are not overlapped with each other as much as possible within a frequency band range in which the ultrasonic transducer of the transmitter 2A can transmit the ultrasonic wave.

Then, the transmission signal generating module 13A may generate the first transmission pulse signal, the second transmission pulse signal, and the third transmission pulse signal in this order, each time it receives the transmission triggers Tr1A-Tr3A, respectively. Thus, in the sequence SaA, the first to third transmission pulse signals may be generated so that the mutual time intervals become T1$a$, T2$a$, and T3$a$. Moreover, in the sequence SbA, the first to third transmission pulse signals may be generated so that the mutual time intervals become T1$b$, T2$b$, and T3$b$. Moreover, in the sequence ScA, the first to third transmission pulse signals may be generated so that the mutual time intervals become T1$c$, T2$c$, and T3$c$.

Note that, after each transmission pulse signal generated by the transmission signal generating module 13A is multiplied by a given window function (for example, a Gaussian window, a Hamming window), it may then be outputted to the transmitting part 6A. After the first to third transmission pulse signals outputted to the transmitting part 6A are amplified by the transmitting part 6A, they may be then transmitted underwater from the transmitter 2A as the first to third transmission pulse waves P1A-P3A, respectively (refer to FIG. 20(B)). That is, from the transmitter 2A, the first transmission pulse wave P1A, the second transmission pulse wave P2A, and the third transmission pulse wave P3A may repeatedly be transmitted at the time intervals Ta (T1$a$, T2$a$, T3$a$), Tb (T1$b$, T2$b$, T3$b$), and Tc (T1$c$, T2$c$, T3$c$), respectively. Note that, in FIG. 20(B), the pulse signals by which the window function is not multiplied are illustrated.

Moreover, the transmission signal generating module 13A may continuously generate the sequence SaA, SbA, and ScA comprised of the first transmission pulse signal, the second transmission pulse signal, and the third transmission pulse signal which are continuous in time with intervals therebetween. In the relation between the two adjacent sequences in time, the first transmission pulse signal included in the sequence generated first may be the first pulse signal, and the second transmission pulse signal included in the sequence generated first may be the second pulse signal. Moreover, in the relation between the two adjacent sequences in time, the first transmission pulse signal included in the sequence generated thereafter may be the third pulse signal, and the second transmission pulse signal included in the sequence generated thereafter may be the fourth pulse signal. That is, the transmission signal generating module 13A may generate, in two consecutive sequences in time, the first pulse signal and the second pulse signal included in the first sequence, and the third pulse signal and the fourth pulse signal included in the next sequence.

The filter coefficient generating module 14A may generate the filter coefficients for extracting the first to third echo signals obtained from the respective reflection waves of the first to third transmission pulse waves P1A-P3A based on the information on the first to third frequency bands notified from the controlling module 11A, and the filter specification.

In detail, the filter coefficient generating module 14A may generate a first filter coefficient $\alpha 1A$ for extracting the first echo signal, a second filter coefficient $\alpha 2A$ for extracting the second echo signal, and a third filter coefficient $\alpha 3A$ for extracting the third echo signal. The filter coefficients $\alpha 1A$-$\alpha 3A$ generated by the filter coefficient generating module 14A may be notified to the echo signal acquiring module 15A. Note that the filter coefficient generating module 14A may be constituted as follows. In detail, out of a plurality of filter coefficients which are generated based on a plurality of predefined filter specifications and stored in the memory, the filter coefficient generating module 14A may be configured to select a filter coefficient based on the number for selecting the filter specification notified from the controlling module 11A, and notifying the selected filter coefficient to the echo signal acquiring module 15A.

Figure 21:
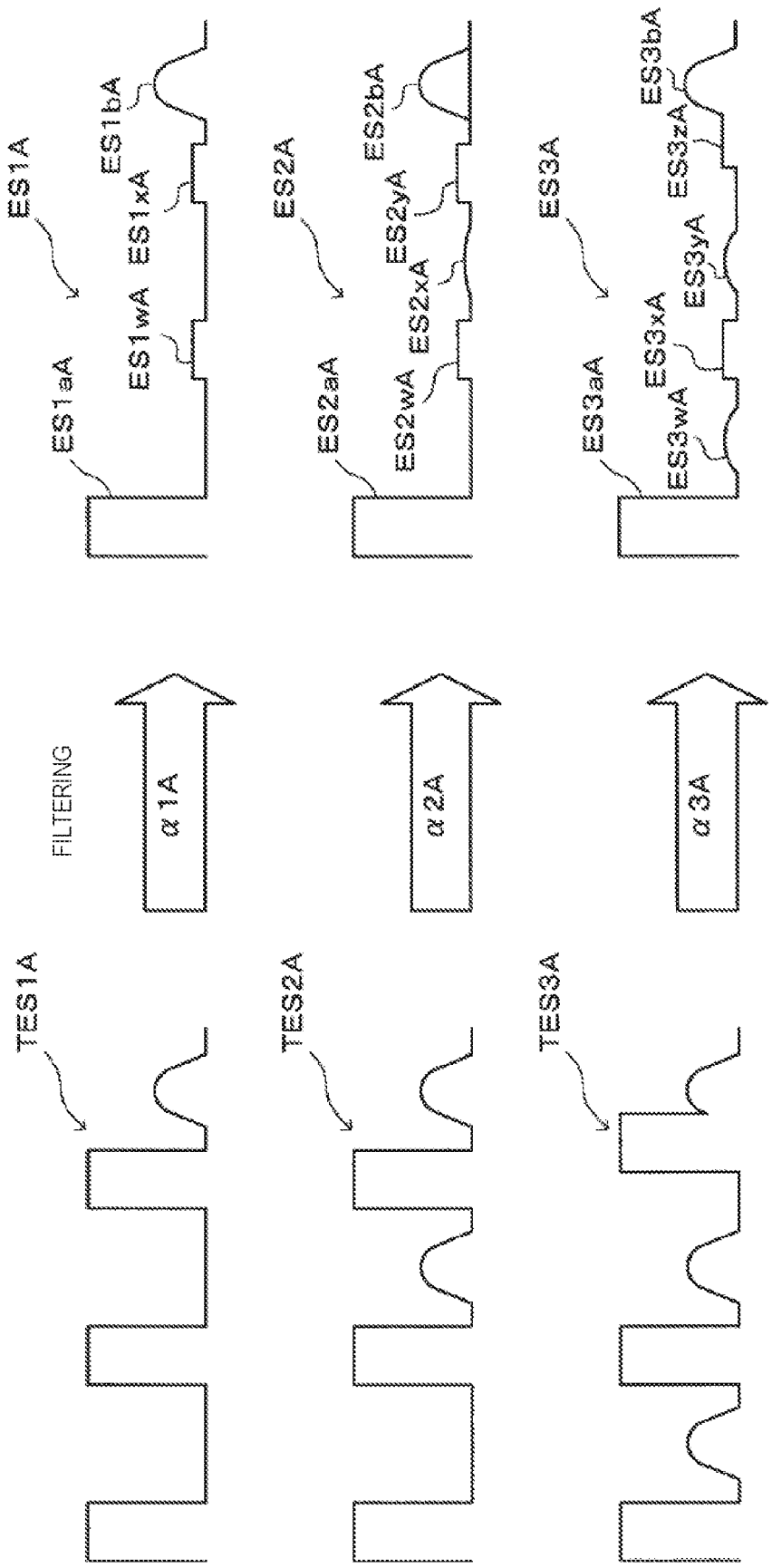
FIG. 21 is a view schematically illustrating the echo signals before and after filtering is performed by the filter processor.

FIG. 21 is a view schematically illustrating echo signals before and after the filtering is performed by the filter processor 18A. Referring to FIG. 19, FIGS. 20(C) to 20(F), and FIG. 21, the echo signal acquiring module 15A may acquire the echo signals of the frequency bands corresponding to the respective frequency bands, i.e., a first echo signal ES1A, a second echo signal ES2A, and a third echo signal ES3A, from the echo signals outputted from the receiver 3A side.

The echo signal acquiring module 15A may have a single echo signal extraction module 16A. The echo signal extraction module 16A may be provided corresponding to the single ultrasonic transducer of the receiver 3A.

The echo signal extraction module 16A may have the buffer processor 17A and the filter processor 18A.

The buffer processor 17A may store the echo signals (refer to FIG. 20(C)) sent from the receiver 3A, and output the echo signals after receiving the transmission trigger of the same kind until it receives the next transmission trigger of the same kind, to the filter processor 18A as the extracted echo signals. In detail, the buffer processor 17A may output a first extracted echo signal TES1A which is an echo signal after receiving the first transmission trigger Tr1A until it next receives the first transmission trigger Tr1A to the filter processor 18A. Moreover, the buffer processor 17A may output a second extracted echo signal TES2A which is an echo signal after receiving the second transmission trigger Tr2A until it next receives the second transmission trigger Tr2A to the filter processor 18A. Moreover, the buffer processor 17A may output a third extracted echo signal TES3A which is an echo signal after receiving the third transmission trigger Tr3A until it next receives the third transmission trigger Tr3A to the filter processor 18A. Thus, the buffer processor 17A may output each of the extracted echo signals TES1A, TES2A, and TES3A which are extracted sequentially, to the filter processor 18A.

The filter processor 18A may extract the first to third echo signals using the respective filter coefficients $\alpha 1A$, $\alpha 2A$, and $\alpha 3A$ generated by the filter coefficient generating module 14A. In detail, the filter processor 18A may extract a first echo signal ES1A by filtering the first extracted echo signal TES1A using the first filter coefficient $\alpha 1A$. Moreover, the filter processor 18A may extract a second echo signal ES2A by filtering the second extracted echo signal TES2A using the second filter coefficient $\alpha 2A$. Moreover, the filter processor 18A may extract a third echo signal ES3A by filtering the third extracted echo signal TES3A using the third filter coefficient $\alpha 3A$. Thus, the filter processor 18A may serve as a band pass filter. However, the filter processor 18A may not be the band pass filter itself, but may have another configuration which acts similarly. For example, the filter processor 18A may be constituted by combining the mixer and the low pass filter which convert a signal into a signal at a frequency near a direct current.

The first echo signal ES1A may include self-frequency echo signals ES1$a$A and ES1$b$A resulting from the first transmission pulse wave P1A transmitted in order to obtain the first echo signal ES1A, and other-frequency echo signals ES1$w$A and ES1$x$A resulting from the transmission pulse waves P2A and P3A of other frequency bands. Since the self-frequency echo signals ES1$a$A and ES1$b$A are almost not influenced by the first filter coefficient $\alpha$1A, their amplitudes may be generally the same before and after the filtering. On the other hand, the other-frequency echo signals ES1$w$A and ES1$x$A may reduce their amplitudes greatly by the filtering using the first filter coefficient $\alpha$1A.

The second echo signal ES2A may include self-frequency echo signals ES2$a$A and ES2$b$A resulting from the second transmission pulse wave P2A transmitted in order to obtain the second echo signal ES2A, and other-frequency echo signals ES2$w$A, ES2$x$A, and ES2$y$A resulting from the transmission pulse waves P1A and P3A of other frequency bands. Since the self-frequency echo signals ES2$a$A and ES2$b$A are almost not influenced by the second filter coefficient $\alpha$2A, their amplitudes may be generally the same before and after the filtering. On the other hand, the other-frequency echo signals ES2$w$A, ES2$x$A, and ES2$y$A may reduce their amplitudes greatly by the filtering using the second filter coefficient $\alpha$2A.

The third echo signal ES3A may include self-frequency echo signals ES3$a$A and ES3$b$A resulting from the third transmission pulse wave P3A transmitted in order to obtain the third echo signal ES3A, and other-frequency echo signals ES3$w$A, ES3$x$A, ES3$y$A, and ES3$z$A resulting from the transmission pulse waves NA and P2A of other frequency bands. Since the self-frequency echo signals ES3$a$A and ES3$b$A are almost not influenced by the third filter coefficient $\alpha$3A, their amplitudes may be generally the same before and after the filtering. On the other hand, the other-frequency echo signals ES3$w$A, ES3$x$A, ES3$y$A, and ES3$z$A may reduce their amplitudes greatly by the filtering using the third filter coefficient $\alpha$3A.

The image data generating module 20A may generate the image data of the detection image based on signal levels of the echo signals according to the depth at each position in the moving direction D1, obtained from the echo signal extraction module 16A.

FIG. 22(A) illustrates an image generated based on the image data generating module 20A, and is a view illustrating one example of the image displayed on the display unit 8A. FIG. 22(B) is an image generated based on the image data generating module 20A when the transmission interval of the transmission pulse wave is a single kind, and is a view illustrating a comparative example of the image displayed on the display unit 8A. In FIGS. 22(A) and 22(B), the left-and-right direction of the image is the moving direction D1 of the ship S, and the up-and-down direction is a depth direction D2 (the vertical direction).

In the images illustrated in FIGS. 22(A) and 22(B), for simplifying the description, a seabed image is not displayed on the display unit 8A, and a situation where images to be displayed on the display unit 8A are only an emission line image TL and a school-of-fish image TG is described. In FIGS. 22(A) and 22(B), as one example, a state where the emission line image TL and the school-of-fish image TG are drawn in the detection image, and emission line false images L and school-of-fish false images F are displayed around the school-of-fish image TG. Moreover, the echo images adjacent to each other in the moving direction D1 are actually displayed without being discrete in the moving direction D1. However, in this embodiment, giving priority to visual clarity, the echo images adjacent to each other in the moving direction D1 are partially displayed so as to be dispersed in the moving direction D1.

Note that, in the image illustrated in FIGS. 22(A) and 22(B), areas with the echo intensities more than a threshold are hatched, where the echo intensity does not correspond to the density of the hatching.

Referring to FIGS. 18 and 22(A), as described above, the time intervals between the transmission pulses P1A-P3A may be mutually differentiated in the sequences SaA, SbA, and ScA. As a result, the emission line false images L are displayed in zigzag in the moving direction D1. Further, the school-of-fish false images F are also displayed in zigzag in the moving direction D1. In FIG. 22(A), as a reference, the areas indicative of the school-of-fish false images F may be enclosed with two-dot chain lines which are imaginary lines. On the other hand, the school-of-fish image TG may be an image which is continuous in the moving direction D1.

Thus, as for each of the emission line false images L and the school-of-fish false images F which are false images, the images may be shifted in the depth direction D2, and their shapes may be displayed so that the positions in the depth direction D2 are in disorder in the moving direction D1. Thus, it may become easier to discriminate the emission line false images L and the school-of-fish false images F which are the false images from the school-of-fish image TG. That is, by differentiating the transmission cycles of the transmission pulse waves P1A-P3A for each of the sequences SaA, SbA, and ScA, the emission line false images L and the school-of-fish false images F resulting from the other-frequency echo signals may appear at different positions for the echo intensity of the area obtained corresponding to each of the adjacent positions in the moving direction.

On the other hand, referring to FIG. 22(B), in the comparative example in which the time intervals between the transmission pulses are a single kind (for example, TA/3), portions of the emission line false images L and the school-of-fish false images F which result from each sequence may be displayed so as to be enlarged so that each portion has the shape united in a bundle in the moving direction D1. This may make difficult to identify the school-of-fish false images F and the school-of-fish image TG.

[Effects]

As described above, in the underwater detection device 1A according to the second embodiment, after the first transmission pulse wave P1A is transmitted, the second transmission pulse wave P2A of which the frequency band is different from the first transmission pulse wave P1A may be transmitted at the time interval shorter than the time TA required for the ultrasonic wave to go and come back in the detection range R. By doing so, since the subsequent transmission pulse wave can be transmitted at a shorter time interval, the subsequent echo signal can be acquired in a shorter period of time. In addition, since the frequency band of the first transmission pulse wave P1A is different from the frequency band of the second transmission pulse wave P2A, it may become possible, for example by using the filter etc., to extract the echo signal of the desired frequency band out of the echo signals in which a plurality of frequency bands are mixed.

Moreover, according to the underwater detection device 1A, the time intervals between the transmission pulse waves P1A-P3A in one sequence (each of SaA, SbA, and ScA) may differ from each other. By this configuration, in the underwater detection image obtained based on the two adjacent sequences in the moving direction D1 (in other words, in time), the school-of-fish false images F may present the discontinuous shapes in the moving direction D1. As a result, the false image suppressing effect in which the school-of-fish false images F and the school-of-fish image TG may become easier to be identified can be acquired.

[Modification of Second Embodiment]

Although the second embodiment of the present disclosure is described above, the present disclosure is not limited to the embodiment, and various changes may be possible for the present disclosure without departing from the spirit of the present disclosure.

Figure 23:
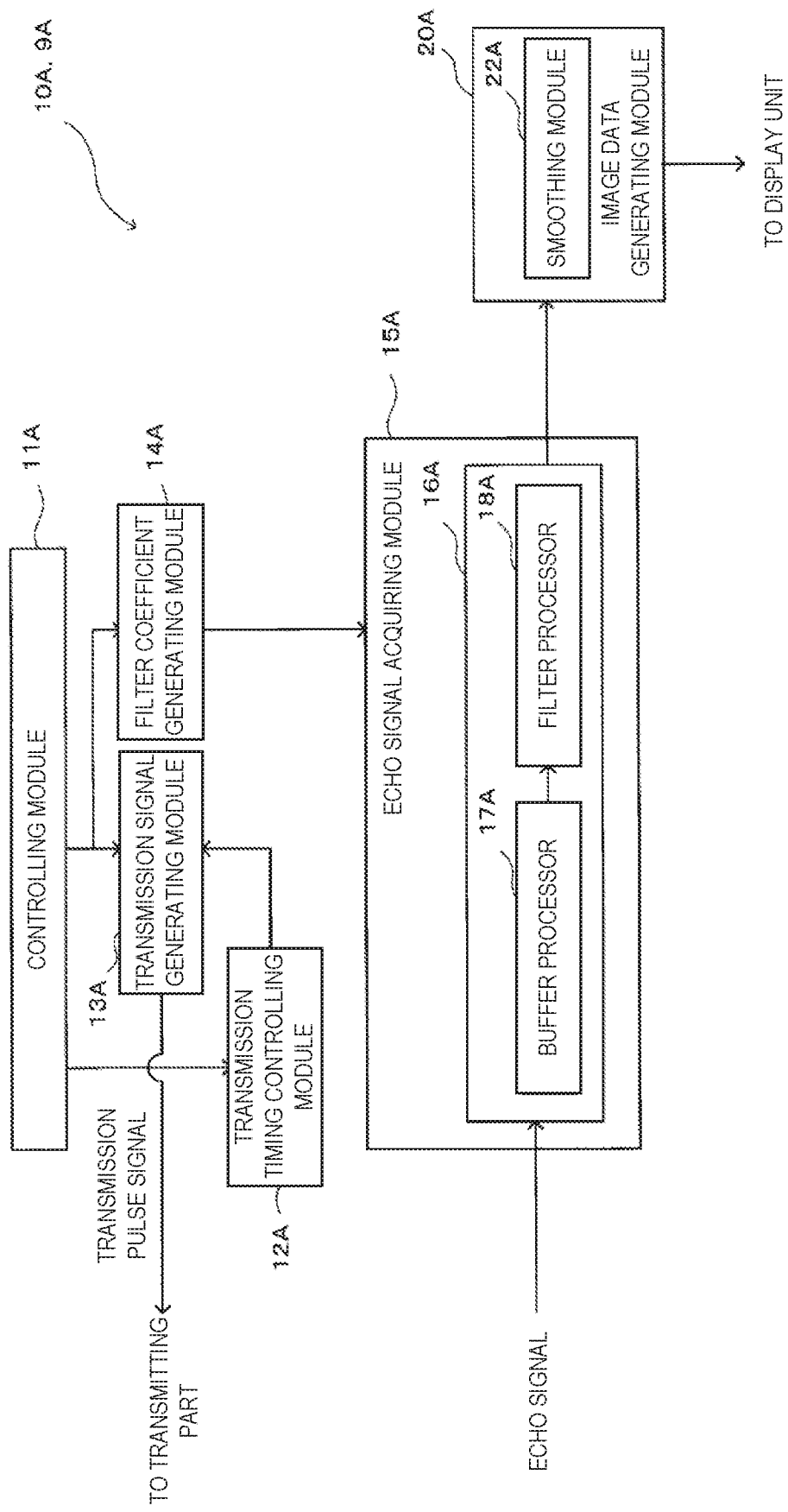
FIG. 23 is a block diagram illustrating a configuration of a signal processor according to a first modification of the second embodiment.

(1) FIG. 23 is a block diagram illustrating a configuration of the signal processor 10A according to a first modification of the second embodiment.

In the above embodiment, as described using FIGS. 21, 22(A), and 22(B), even if the filter processor 18A tries to extract only the echo signals of desired frequency bands (for example, the self-frequency echo signals ES1$a$A, ES1$b$A), the echo signals of other frequency bands (for example, the other-frequency echo signals ES1$w$A and ES1$x$A; hereinafter, the echo signals are referred to as the "false image factor signals") may remain a little, and therefore, the emission line false images L and the school-of-fish false images F may occur in the echo image due to the false image factor signals. Regarding this situation, in this modification, the emission line false images L and the school-of-fish false images F which may appear on the display unit 8A can be reduced by performing randomizing of the transmission cycle of the transmission pulse and smoothing of the echo intensities, as will be described later in detail.

[Randomizing of Transmission Cycle of Transmission Pulse]

Figure 24:
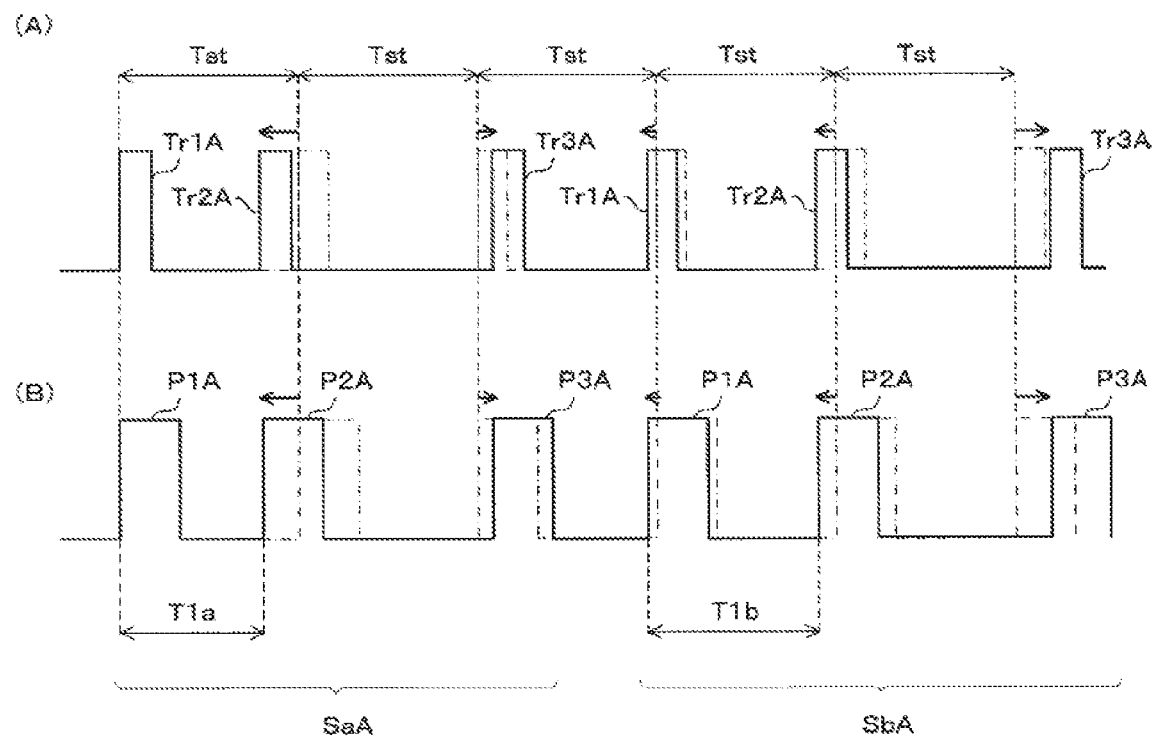
FIG. 24(A) is a time chart of the transmission trigger outputted from the transmission timing controlling module of the signal processor illustrated in FIG. 23.
FIG. 24(B) is a time chart of the pulse wave transmitted from the transmitter in response to the transmission trigger illustrated in FIG. 24(A).

Referring to FIG. 24, the transmission timing controlling module 12A of this modification may output the transmission triggers Tr1A-Tr3A at random timings which fall within a range of ±20% with respect to the reference cycle Tst which is the same time interval as ⅓ (=TA/the number of kinds of sequence) of the cycle TA of the sequence in the second embodiment. Thus, in connection with this, the cycles of the transmission pulse waves P1A-P3A may be also randomized. Therefore, in the relation between the two temporally continuous sequences SaA and SbA, the second time interval T1$b$ which is the time interval between the first transmission pulse wave (referred to as the "third pulse wave") and the second transmission pulse wave (referred to as the "fourth pulse wave") which are included in the second sequence SbA transmitted later may differ from first time interval T1$a$ which is the time interval between the first transmission pulse wave NA and the second transmission pulse wave which are included in the first sequence SaA transmitted first. By doing so, although the details will be described below, in each in-area echo intensity, it may become possible to change the position at which the false images resulting from the other-frequency echo signals appear, for every transmission.

[Smoothing of Echo Intensities]

Referring to FIG. 23, the image data generating module 20A of the signal processor 10A of this modification may have a smoothing module 22A as the false image reducing module for reducing the false images. In detail, the image data generating module 20A may first read the signal level of the echo signal according to the depth (the depth direction D2) at each position in the moving direction D1, obtained from the echo signal extraction module 16A. Then, the smoothing module 22A may smooth the echo intensities obtained corresponding to the adjacent positions in the moving direction D1. In detail, as one example, as for the echo intensities obtained corresponding to the adjacent positions in the moving direction D1, corresponding echo intensities in the depth direction D2 are smoothed. Then, the image data generating module 20A may generate an image data of the detection image by using the echo intensity for every moving direction position for which the smoothing is performed. The smoothing performed by the smoothing module 22A may include the average, the weighted average, and the minimum value selection. For example, in order to perform the weighted average, the smoothing module 22A may be constituted using the FIR filter or the IIR filter.

FIG. 25(A) is a view illustrating one example of the detection image before performing the randomizing and the smoothing. Moreover, FIG. 25(B) is a view illustrating one example of the detection image after performing the randomizing and the smoothing.

By performing the randomization of the transmission cycle of the transmission pulse as described above, the false images resulting from the other-frequency echo signals may appear at different positions in the echo intensities obtained corresponding to the adjacent moving direction positions. FIG. 25(A) illustrates the first echo image generated based on the image data before the randomizing and the smoothing are performed (for example, the first image data).

Referring to FIG. 25(A), as described above, in the comparative example in which the time interval between the transmission pulses is a single kind, the school-of-fish false images F may be displayed so as to be enlarged so that the portion resulting from each sequence becomes the shape continuous in the moving direction D1 (in time series). Thus, it may be difficult to identify the school-of-fish false images F and the school-of-fish image TG.

On the other hand, referring to FIG. 25(B), in the underwater detection device 1A according to this modification, as described above, the first image data and the second image data obtained corresponding to the adjacent positions in the traveling direction may be smoothed. In this modification, the intervals of the transmission pulse waves which are adjacent to each other in time may be randomized. For this reason, the portions resulting from the transmission pulse waves adjacent to each other in time, of the emission line false images L and the school-of-fish false images F which appear in each image data may shift from each other in the depth direction D2. By smoothing the first image data and the second image data generated in this way, the echo intensities of the emission line false images L and the school-of-fish false images F can be reduced, while maintaining the echo intensity of the desired school-of-fish image TG. In FIG. 25(B), thin contour lines of the images express that the densities of the emission line false images L and the school-of-fish false images F may be lower than the densities of the emission line TL and the school-of-fish image TG.

As described above, by randomizing the timings at which the transmission pulse waves P1A-P3A are transmitted within the given range like this modification, the positions of the emission line false images L and the school-of-fish false images F included in each echo image can be mutually shifted in the depth direction D2. By doing so, it may become possible to further reduce the emission line false images L and the school-of-fish false images F included in the synthesized image data, for example, by smoothing as described above in this modification.

Moreover, in this modification, the densities of the emission line false images L and the school-of-fish false images F which may be included in the synthesized image data can be reduced by smoothing of the smoothing module 22A.

Moreover, like this modification, by smoothing the first image data and the second image data which are obtained corresponding to the adjacent positions, the emission line false images L and the school-of-fish false images F which may be included in the synthesized image data can be appropriately reduced.

Note that, although the false images are reduced by smoothing the echo intensities at the adjacent positions in the moving direction D1, the present disclosure is not limited to this configuration. In detail, the number of echo intensities smoothed at the moving direction positions may be three or more.

Moreover, in this modification, although the transmission timings of the transmission pulse waves P1A-P3A are randomized, the present disclosure is not limited to this configuration. In detail, even if there are regularities in the transmission timings of the transmission pulse waves P1A-P3A, each of the timings at which the transmission pulse waves P1A-P3A are transmitted is desirably not to be constant.

Moreover, although in this modification the underwater detection device which can perform both the randomizing of the transmission timings of the transmission pulse waves P1A-P3A and the smoothing by the smoothing module 22A is described, the present disclosure is not limited to this configuration. In detail, in the signal processor 10A according to the modification illustrated in FIG. 23, the smoothing module 22A may be omitted. Even in this case, although the effects of the false image reduction by the smoothing of echo intensities are not acquired, for example, the emission line false images L and the school-of-fish false images F illustrated in FIG. 25(B) are displayed in a generally blurred state. As a result, the user may observe the reduced echo intensities of the emission line false images L and the school-of-fish false images F.

Figure 26:
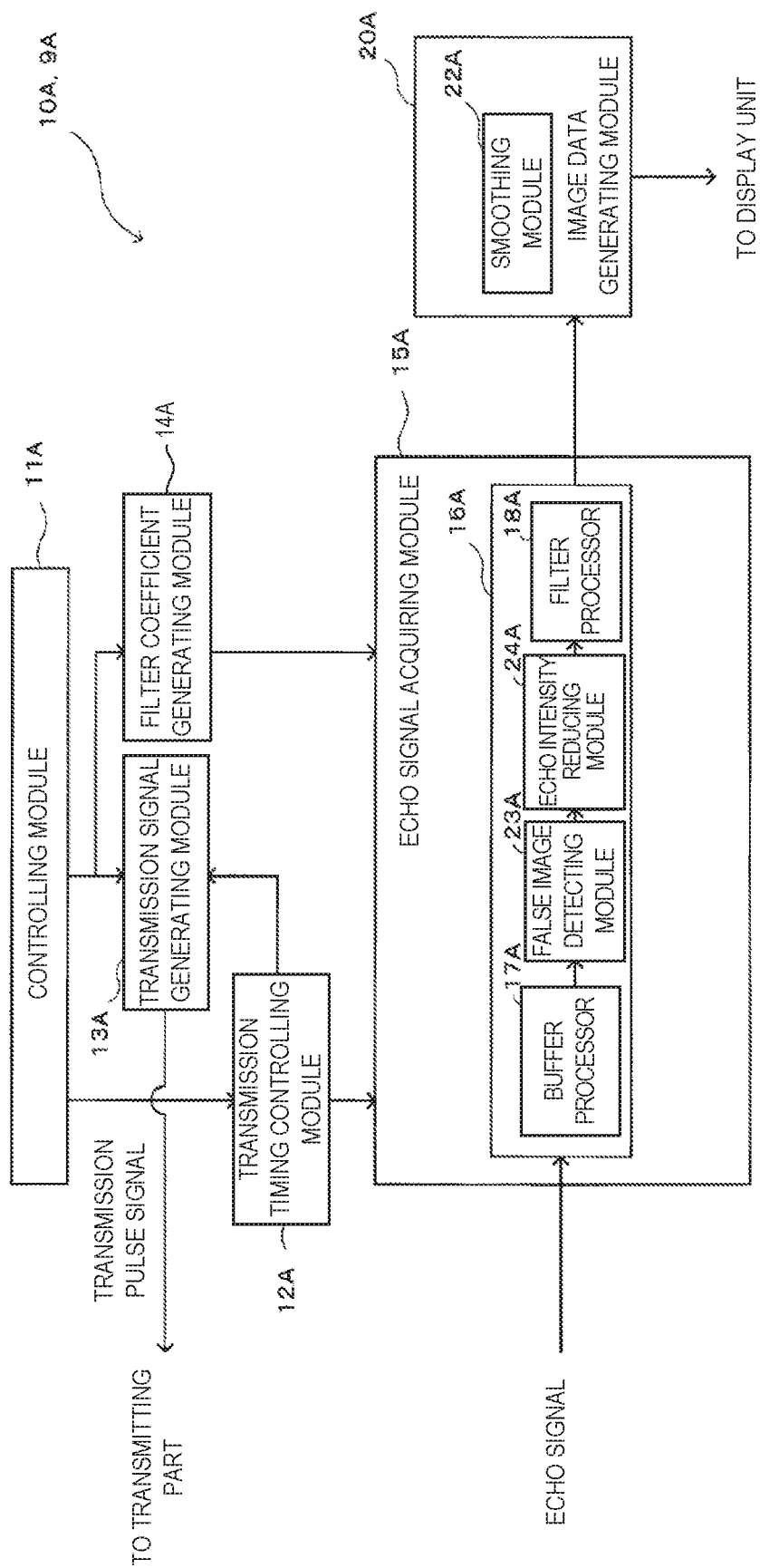
FIG. 26 is a block diagram illustrating a configuration of a signal processor of the underwater detection device according to a second modification of the second embodiment.
Figure 27:
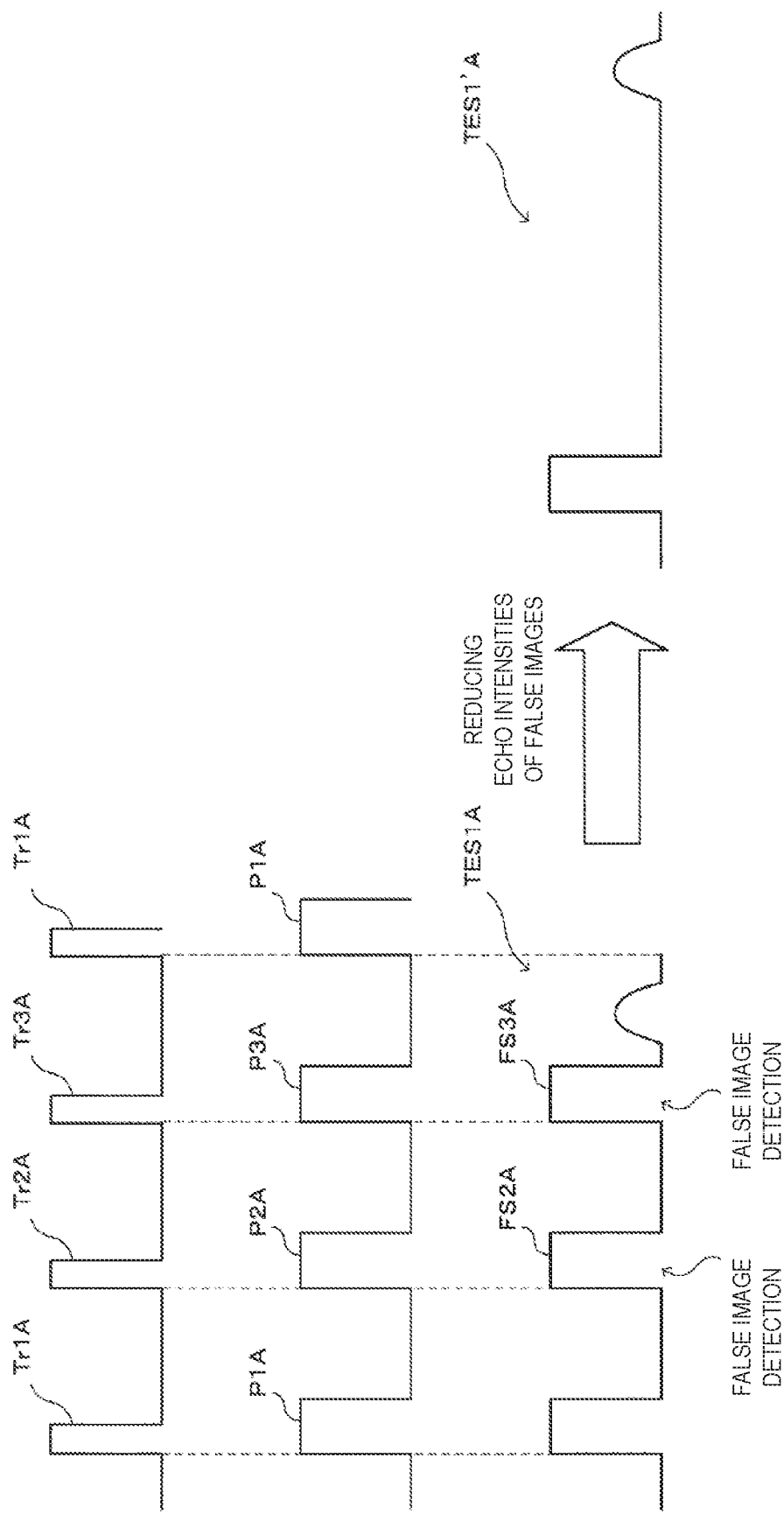
FIG. 27 is a schematic view illustrating a process in which false image factor signals are reduced by an echo signal acquiring module of the signal processor according to the second modification of the second embodiment illustrated in FIG. 26.

(2) FIG. 26 is a block diagram illustrating a configuration of the signal processor 10A of the underwater detection device according to a second modification of the second embodiment. Moreover, FIG. 27 is a schematic view illustrating a process of reducing the false image factor signals by the echo signal acquiring module 15A of the signal processor 10A according to the second modification of the second embodiment illustrated in FIG. 26.

In the modification described above, although the smoothing module 22A is described as the false image reducing module which reduces the emission line false images L and the school-of-fish false images F, the present disclosure is not limited to this configuration. In detail, referring to FIGS. 26 and 27, each echo signal extraction module 16A of the echo signal acquiring module 15A of this modification may further include, in addition to the buffer processor 17A and the filter processor 18A, a false image detecting module 23A and an echo intensity reducing module 24A.

The false image detecting module 23A may detect the false image factor signals included in the first to third extracted echo signals TES1A, TES2A, and TES3A (FIG. 21) extracted by the buffer processor 17A. Referring to FIGS. 26 and 27, if the first extracted echo signal TES1A is described as one example, it may be considered that the false image factor signals included in the first extracted echo signal TES1A include the echo signal FS2A obtained at almost the same timing as the timing at which the second transmission pulse wave P2A is transmitted (in other words, the timing at which the second transmission trigger is outputted). This may be because the second transmission pulse wave P2A transmitted from the transmitter 2A is directly received by the receiver 3A, with no time interval. Similarly, it may be considered that the false image factor signals included in the first extracted echo signal TES1A include the echo signal FS3A obtained at almost the same timing as the timing at which the third transmission pulse wave P3A is transmitted (in other words, the timing at which the third transmission trigger is outputted). This may be because the third transmission pulse wave P3A transmitted from the transmitter 2A is directly received by the receiver 3A, with no time interval. The false image detecting module 23A may be notified of the transmission timing of the second transmission trigger Tr2A and the transmission timing of the third transmission trigger Tr3A from the transmission timing controlling module 12A. Then, the false image detecting module 23A may detect the signal with a comparatively large amplitude generated immediately after receiving the second transmission trigger Tr2A, and the signal with a comparatively large amplitude generated immediately after receiving the third transmission trigger Tr3A as the false image factor signals FS2A and FS3A.

The echo intensity reducing module 24A may reduce the echo intensities of the false image factor signals FS2A and FS3A detected by the false image detecting module 23A. The method of reducing the echo intensities of the false image factor signals FS2A and FS3A may include a method of replacing the echo intensities (amplitudes) of the false image factor signals FS2A and FS3A by another value, such as zero or a small value, and a method of replacing the echo intensities (amplitudes) by interpolated values calculated based on the received echo signals adjacent to each other in time. The echo intensity reducing module 24A may output the first extracted echo signal of which the echo intensities of the false image factor signals FS2A and FS3A are replaced, for example, by zero, according to such processing, to the filter processor 18A, as first echo signal TES1'A.

Note that, for the second extracted echo signal TES2A, the false image factor signals resulting from the first transmission pulse wave and the third transmission pulse wave may be replaced similarly to the method described for the first extracted echo signal TES1A. Similarly, for the third extracted echo signal TES3A, the false image factor signals resulting from the first transmission pulse wave and the second transmission pulse wave may be replaced similarly to the method described for the first extracted echo signal TES1A.

As described above, according to this modification, the false image factor signals resulting from the transmission pulse waves of other frequencies can be reduced. Therefore, the false images which may appear in the echo image displayed on the display unit 8A can be made inconspicuous.

Note that, in this modification, although the false image detecting module 23A and the echo intensity reducing module 24A as the false image reducing module are provided before the filter processor 18A, the present disclosure is not limited to this configuration. In detail, the false image detecting module 23A and the echo intensity reducing module 24A may be provided after the filter processor 18A. That is, referring to FIG. 21, the false image factor signals may be detected in the filtered echo signals ES1A, ES2A, and ES3A, and these echo intensities may be reduced. Even in this case, the false images which may appear in the echo image displayed on the display unit 8A can be made inconspicuous.

Alternatively, the false image detecting module 23A and the echo intensity reducing module 24A may be provided to the image data generating module 20A. In this case, the false image detecting module 23A may detect the emission line false images L and the school-of-fish false images F while referring to the transmission timings of the respective transmission triggers, for example, in each image data illustrated in FIG. 25(B). Then, the echo intensity reducing module 24A may reduce the echo intensities of the emission line false images L and the school-of-fish false images F detected by the false image detecting module 23A. Even in this case, the false images which may appear in the echo image displayed on the display unit 8A can be made inconspicuous.

(3) Note that, in the second embodiment, (a1) the transmission timings of the plurality of the transmission pulse waves in one sequence may be differentiated between the sequences (SaA, SbA, and ScA). Moreover, in the modification, (a2) the transmission timings of the plurality of transmission pulse waves in one sequence may be randomized between the sequences (SaA, SbA, and ScA), and (b) the echo signal levels of the receiving pulse waves which are adjacent to each other in time may be smoothed. Moreover, in the modification, (c) the amplitude values of the echo signals leading to false image factor signals FS2A and FS3A may be replaced by other values. Note that, in the following, when selectively expressing the above (a1) and (a2), one of them may be simply referred to as "(a)." Further, a configuration provided with two, three, or all of the above (a) to (c) may be adopted.

For example, the configuration of (a1) in which the transmission timings of the transmission pulses are differentiated, and the configuration of (b) in which the echo signal levels of the receiving pulse waves which are adjacent to each other in time are smoothed may be combined.

Moreover, the configuration of (a) in which the transmission timings of the transmission pulses are differentiated or randomized, and the configuration of (c) in which the amplitude values of the echo signals leading to the false image factor signals FS2A and FS3A are replaced by other values may be combined.

The configuration of the signal processor 10A when all the three configurations of the above (a) to (c) are adopted may be realized by the configuration illustrated in FIG. 26.

(4) In the second embodiment and its modification described above, the single channel (CH) configuration in which the receiver 3A is sole is described. In such a configuration, as long as it is a device which does not carry out the electronic scanning using the echo data, configurations of the second embodiment and its modification may be applied to the underwater detection device with a plurality CHs of two or more CHs, without being limited to the underwater detection device of 1CH. In detail, the configurations of the second embodiment and its modification may be applied to a side-scanning sonar provided with 2CHs comprised of a starboard-side detection beam and a port-side detection beam of the ship S. Moreover, the configurations of the second embodiment and its modification may be configured to detect any one of the forward, the starboard side, and the port side of the ship S.

(5) Although in the above embodiments the transmitter 2A and the receiver 3A are provided separately, it is not limited to this configuration. The transmitter 2A and the receiver 3A may be comprised of a single ultrasonic transducer. For example, even if the emission lines as transmission pulse wave lines of different frequencies are saturated, the echo signal values indicative of the emission lines are replaced by other values to avoid the influence of the saturation.

DESCRIPTION OF REFERENCE CHARACTERS 1, 1a Underwater Detection Device (Ultrasonic Detecting Device)
2 Transmitter
3 Receiver
3a Wave Receiving Element
4a Motor (Rotation Driving Part)
13 Transmission Signal Generating Module
15, 15a Echo Signal Acquiring Module
20, 20a In-fan-area Detection Data Generating Module (Image Data Generating Module)
21 3D Echo Data Processing Module (Synthesized Image Data Generating Module)

What is claimed is:

1. An ultrasonic detecting device for detecting target object within a given detection range, the device comprising:
 a transmitter configured to transmit a first sequence including a first pulse wave in a first frequency band and a second pulse wave in a second frequency band, the second frequency band being a different frequency band from the first frequency band, a time interval between the first pulse wave and the second pulse wave being set to a first time interval, the first time interval being shorter than a time for ultrasound in water to make a round trip to the detection range;
 a receiver comprising a plurality of receiving elements, each receiving element of the plurality of receiving elements receiving a reflection wave of the first pulse wave and the second pulse wave, and each receiving element of the plurality of receiving elements converting the reflection wave into an echo signal;
 a motor configured to rotate at least the receiver; and
 processing circuitry configured to:
  retrieve a first echo signal and a second echo signal from the echo signal, the first echo signal being retrieved from a frequency band corresponding to the first frequency band and the second echo signal being retrieved from a frequency band corresponding to the second frequency band,
  generate a first image data and a second image data, the first image data being generated by performing a beamforming based on each first echo signal retrieved from the plurality of receiving elements, the second image data being generated by performing a beamforming based on each second echo signal retrieved from the plurality of receiving elements, and
  generate a synthesized image data by synthesizing the first image data and the second image data based on an angular position of the receiver rotated by the motor when the first image data is generated and an angular position of the receiver rotated by the motor when the second image data is generated, and
 the transmitter is configured to transmit a second sequence after transmitting the first sequence, the second sequence including a third pulse wave in a third frequency band and a fourth pulse wave in a fourth frequency band, the fourth frequency band being a different frequency band from the third frequency band, a time interval between the third pulse wave and the fourth pulse wave being set to a second time interval, the second time interval being shorter than a time for ultrasound in water to make a round trip to the detection range, the second time interval being different from the first time interval.

2. The ultrasonic detecting device of claim 1, wherein the third frequency band is equal to the first frequency band, and the fourth frequency band is equal to the second frequency band.

3. The ultrasonic detecting device of claim 1, wherein the processing circuitry is further configured to reduce an echo intensity of a false image, the false image being an echo image included in the first image data and caused by the second pulse wave.

4. The ultrasonic detecting device of claim 3, wherein the processing circuitry is further configured to reduce the echo intensity of the false image by smoothing an echo intensity of the first image data and the second image data at corresponding positions in the first image data and the second image data.

5. The ultrasonic detecting device of claim 3, wherein the processing circuitry is further configured to reduce the echo intensity of the false image by smoothing an echo intensity of a plurality of image data among the first image data and the second image data, the smoothing being performed at corresponding positions in the plurality of image data, the plurality of image data being generated with the receiver rotated at substantially a same angular position.

6. The ultrasonic detecting device of claim 3, wherein the processing circuitry is further configured to:
    detect a false image factor signal causing the false image, and
    reduce an echo intensity of the false image factor signal.

7. The ultrasonic detecting device of claim 6, wherein the processing circuitry is further configured to reduce the echo intensity of the false image before the first image data is generated.

8. The ultrasonic detecting device of claim 6, wherein the processing circuitry is further configured to reduce the echo intensity of the false image in the first image data.

9. The ultrasonic detecting device of claim 1, wherein each receiving element of the plurality of receiving elements has a receiving surface having a rectangular shape and is configured to receive the reflection wave from a fan area having a fan shape.

10. The ultrasonic detecting device of claim 1, wherein the motor rotates the receiver is a direction perpendicular to a plane in which the beamforming is performed.

11. The ultrasonic detecting device of claim 1, wherein the receiver and the transmitter are separated from each other and are not moving relative to each other.

12. The ultrasonic detecting device of claim 1, wherein the motor rotates the receiver along a horizontal plane.

13. The ultrasonic detecting device of claim 1, wherein the motor rotates the receiver along a vertical plane.

14. An ultrasonic detecting device for detecting target object within a given detection range, the device comprising:
    a transmitter configured to transmit a plurality of sequences, each sequence of the plurality of sequences including a first pulse wave in a first frequency band and a second pulse wave in a second frequency band, the second frequency band being a different frequency band from the first frequency band, a time interval between the first pulse wave and the second pulse wave being shorter than a time for ultrasound in water to make a round trip to the detection range, and the time interval being different in two sequences of the plurality of sequences;
    a receiver comprising a receiving element that receives a reflection wave of the first pulse wave and the second pulse wave, and that converts the reflection wave into an echo signal; and
    processing circuitry configured to:
        retrieve a first echo signal and a second echo signal from the echo signal, the first echo signal being retrieved from a frequency band corresponding to the first frequency band and the second echo signal being retrieved from a frequency band corresponding to the second frequency band, and
        generate a first image data and a second image data, the first image data being generated based on the first echo signal, the second image data being generated based on the second echo signal.

15. The ultrasonic detecting device of claim 14, wherein the processing circuitry is further configured to smooth an echo intensity of the first image data and the second image data at corresponding positions in the first image data and the second image data.

16. The ultrasonic detecting device of claim 14, wherein the processing circuitry is further configured to:
    detect a false image factor signal causing a false image, the false image being an echo image included in the first image data and caused by the second pulse wave, and
    reduce an echo intensity of the false image factor signal.

17. An ultrasonic detecting method for detecting target object within a given detection range, the method comprising:
    transmitting a first sequence including a first pulse wave in a first frequency band and a second pulse wave in a second frequency band, the second frequency band being a different frequency band from the first frequency band, a time interval between the first pulse wave and the second pulse wave being set to a first time interval, the first time interval being shorter than a time for ultrasound in water to make a round trip to the detection range;
    receiving a reflection wave of the first pulse wave and the second pulse wave with each receiving element of a plurality of receiving elements and converting the reflection wave of each receiving element into an echo signal;
    rotating at least a receiver comprising the plurality of receiving elements;
    retrieving a first echo signal and a second echo signal from the echo signal, the first echo signal being retrieved from a frequency band corresponding to the first frequency band and the second echo signal being retrieved from a frequency band corresponding to the second frequency band;
    generating a first image data and a second image data, the first image data being generated by performing a beamforming based on each first echo signal retrieved from the plurality of receiving elements, the second image data being generated by performing a beamforming based on each second echo signal retrieved from the plurality of receiving elements;
    generating a synthesized image data by synthesizing the first image data and the second image data based on an angular position of the receiver when the first image data is generated and an angular position of the receiver when the second image data is generated; and
    transmitting a second sequence after transmitting the first sequence, the second sequence including a third pulse wave in a third frequency band and a fourth pulse wave in a fourth frequency band, the fourth frequency band being a different frequency band from the third frequency band, a time interval between the third pulse wave and the fourth pulse wave being set to a second time interval, the second time interval being shorter than a time for ultrasound in water to make a round trip to the detection range, the second time interval being different from the first time interval.

18. The ultrasonic detecting method of claim 17, wherein the third frequency band is equal to the first frequency band, and the fourth frequency band is equal to the second frequency band.

\* \* \* \* \*